(12) United States Patent
Fear

(10) Patent No.: US 12,739,468 B2
(45) Date of Patent: Sep. 15, 2026

(54) USER ACTIVITY DETECTION

(71) Applicant: NVIDIA Corporation, Santa Clara, CA (US)

(72) Inventor: Andrew Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/426,631

(22) Filed: Jan. 30, 2024

(65) Prior Publication Data

US 2025/0247580 A1 Jul. 31, 2025

(51) Int. Cl.
*H04N 21/442* (2011.01)

(52) U.S. Cl.
CPC ............................ *H04N 21/44218* (2013.01)

(58) Field of Classification Search
None
See application file for complete search history.

(56) References Cited

U.S. PATENT DOCUMENTS 7,653,265 B2 1/2010 Ruggiero
8,898,687 B2 * 11/2014 Hulten ................ H04N 21/442 725/12
9,232,210 B2 1/2016 More
9,292,904 B2 3/2016 Ruggiero
9,532,140 B2 12/2016 Kim et al.
9,839,854 B2 12/2017 van Welzen et al.
12,231,866 B2 2/2025 Eronen et al.
2003/0052911 A1 * 3/2003 Cohen-solal ........ H04L 65/1101 715/738
2007/0015558 A1 * 1/2007 Zalewski ................ A63F 13/10 463/1
2007/0150916 A1 * 6/2007 Begole ............ H04N 21/42201 382/116
2007/0271518 A1 * 11/2007 Tischer ............. H04N 21/4532 715/744
2009/0015658 A1 1/2009 Enstad et al.

(Continued)

OTHER PUBLICATIONS

Stremlau, Thorsten Peter, Non-Final Office Action for U.S. Appl. No. 18/426,657, filed Jan. 30, 2024, mailed Oct. 17, 2025, 19 pgs.

(Continued)

*Primary Examiner* — Alexander Q Huerta
(74) *Attorney, Agent, or Firm* — IRON SUMMIT IP LLP

(57) ABSTRACT

In various examples, monitoring user interactions for content streaming systems and applications is described herein. For instance, a system(s) that is providing content to a device, such as during an online session associated with an application, may receive sensor data from the device and then use the sensor data to determine whether a user is interacting with the application. The sensor data may include image data representing the user, audio data representing from the user, location data representing a location of the user, input data representing one or more inputs from the user, and/or the like. The system(s) may then determine whether to continue the session or terminate the session based at least on whether the user is interacting with the application. For example, the system(s) may determine to terminate the session based at least on the user not interacting with the application for a threshold amount of time.

20 Claims, 17 Drawing Sheets

(56) References Cited

U.S. PATENT DOCUMENTS

2013/0209073 A1* 8/2013 Carvajal .............. G11B 31/003 386/344
2015/0036999 A1* 2/2015 Batur ................... H04N 21/458 386/230
2015/0378430 A1* 12/2015 Baldwin ................. G06F 3/017 345/156
2016/0240009 A1 8/2016 Lyren
2016/0301974 A1* 10/2016 Hough ............... H04N 21/2668
2018/0027290 A1* 1/2018 Richardson .......... H04N 21/439 725/10
2018/0295420 A1* 10/2018 Rumreich .......... H04N 21/4532
2019/0313187 A1 10/2019 Stoltze et al.
2020/0413138 A1* 12/2020 Graf ......................... G06N 3/09
2021/0055367 A1 2/2021 Poore et al.
2021/0225057 A1* 7/2021 Shuster ................... A63F 13/52
2023/0086490 A1 3/2023 Abraham et al.
2023/0359468 A1* 11/2023 Sivagnanenthirarajah .................. G06V 40/166
2024/0061547 A1 2/2024 Fleizach et al.
2025/0247500 A1 7/2025 Stremlau
2025/0247580 A1 7/2025 Fear

OTHER PUBLICATIONS

Stremlau, Thorsten Peter; Final Office Action for U.S. Appl. No. 18/426,657, filed Jan. 30, 2024, mailed Feb. 26, 2026, 15 pgs.

Stremlau, Thorsten Peter, Non-Final Office Action for U.S. Appl. No. 18/426,657, filed Jan. 30, 2024, mailed Jun. 10, 2026, 16 pgs.

* cited by examiner

900

USER ACTIVITY DETECTION

BACKGROUND

Many applications, such as video conferencing applications, video game applications, and/or streaming applications, allow remote users to communicate using both video and audio. For instance, video and audio that is captured by a first device associated with one or more first users may be output by a second device associated with one or more second users. However, in some circumstances, it may be difficult for users to determine a current speaker and/or determine important information associated with the current speaker. For example, if the first device uses a camera with a field-of-view (FOV) that includes a portion of an environment that is in front of the first device, then the video may not depict a first user that is speaking behind the first device (e.g., outside of the FOV of the camera). As such, it may be difficult for other user(s) to determine the identity of the speaker. This can be important, for example, in situations where the identity of the speaker may help in providing context, feedback, support, and/or the like with regard to the conversation.

Additionally, such as with regard to video game applications and/or streaming applications, systems may monitor inputs from users in order to ensure that the users are still interacting with the applications. For example, as a system is communicating with a user device that is streaming an application during an online session, the system may determine that the user is interacting with the application as long as the system continues to receive inputs from the user via an input device (e.g., a keyboard, a mouse, etc.). In order to conserve computing resources, the systems may then terminate sessions associated with the users when the users stop interacting, such as for threshold periods of time. However, in some circumstances, a user may still be interacting with an application even when the user is not providing physical inputs via an input device. For example, the user may be waiting for an event to occur with a gaming application and/or may be watching another user that is presenting content without physically providing inputs. As such, the system may still terminate the session for the user even though the user is not done interacting with the application.

SUMMARY

Embodiments of the present disclosure relate to providing spatial information and/or monitoring user interactions for content streaming systems and applications. Systems and methods are disclosed that determine information associated with users that are speaking, such as positions of the users with respect to devices and/or identifiers associated with the users, and then provide the information along with videos and/or audio captured using the devices. For instance, a first device may generate image data using one or more image sensors, audio data using one or more microphones, and/or location data using one or more location sensors. The image data, the audio data, and/or the location data may then be processed to determine the information associated with a user that is speaking, where the user may be within a field-of-view (FOV) of the image sensor(s) and/or outside of the FOV of the image sensor(s). A second device that is presenting a video represented by the image data and/or outputting sound represented by the audio data may then further present content associated with the information.

In contrast to conventional systems, such as those described above, systems in accordance with one or more embodiments provide the spatial information along with the video and/or the audio such that other users are able to identify the user that is speaking. For instance, and as described herein, for the conventional systems, such as when a device uses a camera with a FOV that includes only a portion of the surrounding environment, the video captured by the device may not depict a user that is speaking. In such circumstances, it may be difficult for other users that are viewing the video on another device to identify the user. As such, by including the information (e.g., the spatial information) along with the video and/or audio, systems in accordance with one or more embodiments provide a mechanism that other users are able to use in order to identify the user that is speaking. For instance, the other users are able to identify the user based at least on the position and/or the information.

Embodiments of the present disclosure also relate to monitoring user interactions for content streaming systems and applications. For instance, a system(s) that is providing content to a device, such as during an online session associated with an application, may receive sensor data from the device and then use the sensor data to determine whether a user is interacting with the application. The sensor data may include image data representing the user, audio data representing sound (e.g., speech) from the user, location data representing a location of the user, input data representing one or more inputs from the user, and/or the like. The system(s) may then determine whether to continue the session or terminate the session based at least on whether the user is interacting with the application. For example, the system(s) may determine to terminate the session based at least on the user not interacting with the application for a threshold amount of time.

In contrast to conventional systems, such as those described above, the current system(s), in some embodiments, determine whether users are interacting with applications using additional sensor data other than input data. For instance, the conventional systems may determine that a user is not interacting with an application based on the user not providing input using one or more input devices for a threshold period of time. However, if the user is still interacting with the application, such as by viewing content associated with the application and/or waiting for an event to occur, the conventional systems may terminate the session before the user is finished. As such, the systems according to one or more embodiments may use other types of sensor data, such as the image data, to determine that the user is still interacting with the application even though the user is not providing physical inputs. Because of this, systems according to one or more embodiments correctly determine when users are interacting with applications and/or determine when to terminate sessions associated with the applications.

BRIEF DESCRIPTION OF THE DRAWINGS

The present systems and methods for providing spatial information and/or monitoring user interactions for content streaming systems and applications are described in detail below with reference to the attached drawing figures, wherein.

DETAILED DESCRIPTION

Figure 1:
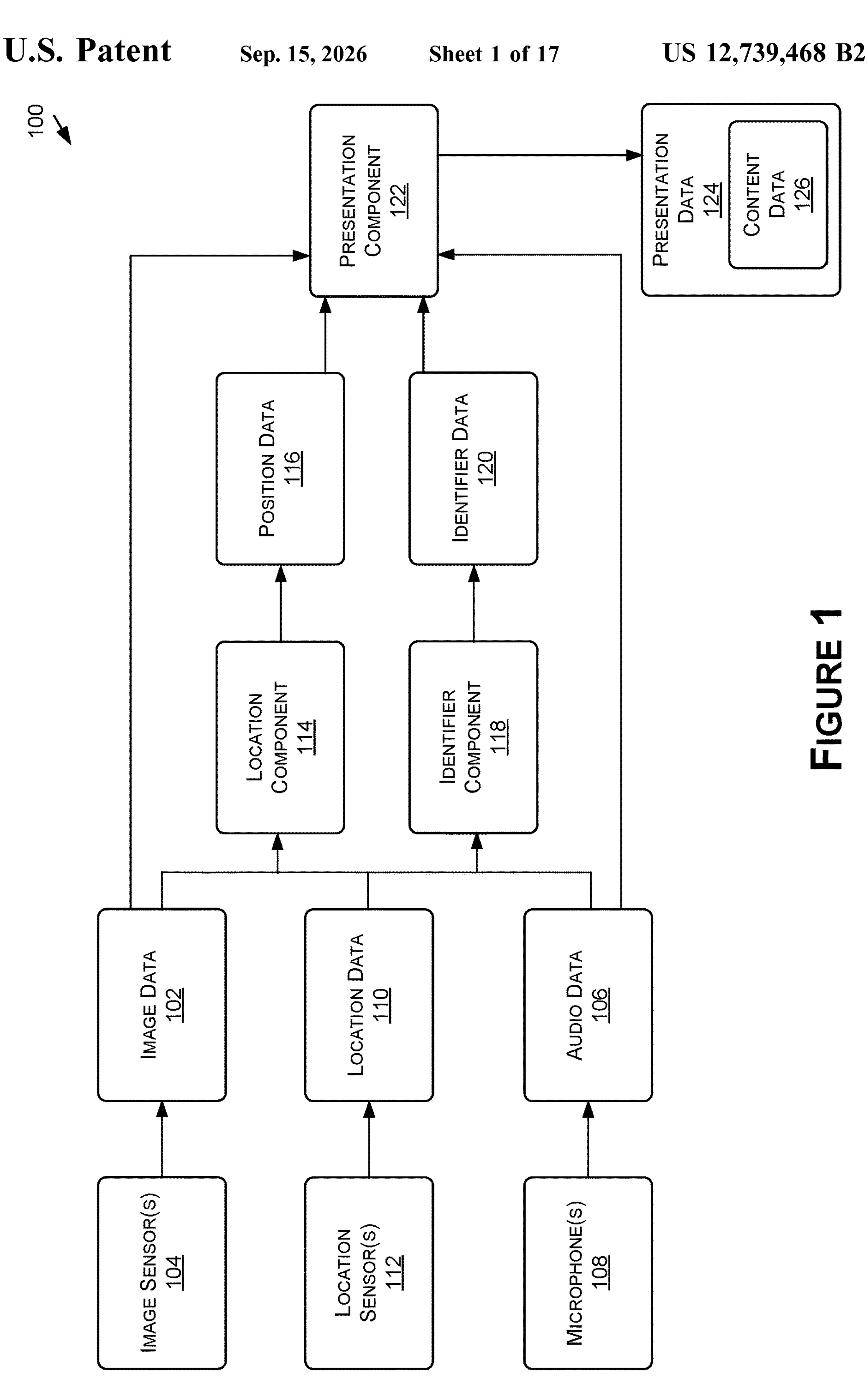
FIG. 1 illustrates an example of a process of providing spatial information for a conversational application, in accordance with some embodiments of the present disclosure.

Systems and methods are disclosed related to providing spatial information and/or monitoring user interactions for content streaming systems and applications. For instance, a system(s) may obtain sensor data generated using one or more sensors of a first device. As described herein, the sensor data may include, but is not limited to, image data generated using one or more images sensors (e.g., one or more cameras), audio data generated using one or more microphones, location data generated using one or more location sensors (e.g., one or more ultrasonic sensors, one or more LiDAR sensors, one or more RADAR sensors, one or more time-of-flight sensors, etc.), input data generated using one or more input devices (e.g., keyboard, mouse, joystick, button, touch screen, etc.), and/or any other type of sensor data. Additionally, as described herein, the system(s) may be included as part of: the first device, a second device that is communicating with the first device, one or more remote computing devices (e.g., a cloud-based system) that are communicating with the first device and/or the second device, and/or any other device. The system(s) may then process at least a portion of the sensor data and, based at least on the processing, determine information associated with a user that is speaking (also referred to as the "speaker"), such as a position and/or identity of the speaker. The system(s) may then cause the second device to provide content associated with the information while outputting one or more images (e.g., a video) represented by the image data and/or audio represented by the audio data.

For more details, in some examples, the image sensor(s) of the first device may have a field-of-view (FOV) that includes part of an environment surrounding the first device, such as the part of the environment that is in front of the first device (e.g., in front of a display of the first device). As such, if the speaker is located outside of the FOV of the image sensor(s), such as behind the first device, then the image(s) may not depict the speaker. Because of this, it may be difficult for one or more users associated with the second device to determine which user is speaking, such as when there are multiple users associated with the first device, where the identity of the speaker may be important for the conversation, or otherwise of interest to one or more other participants of the conversation or members of an audience.

As such, the system(s) may process at least a portion of the sensor data using one or more techniques in order to determine a position associated with the speaker. For a first example, such as if the first device includes multiple microphones that generate the audio data, the system(s) may process the audio data using one or more acoustic source location techniques (e.g., beamforming). Based at least on the processing, the system(s) may then determine the position of the speaker with respect to the first device and/or the environment. For a second example, such as if the device includes one or more location sensors, the system(s) may process the location data and, based at least on the processing, determine the position of the speaker with respect to the first device and/or the environment. Still, for a third example, such as if the speaker is located within the FOV of the image sensor(s) and the image(s) depicts the speaker, the system(s) may process the image data and, based at least on the processing, determine the position of the speaker with respect to the first device and/or the environment.

In any of these examples, and as described herein, the position may include, but is not limited to, a direction with respect to the first device, a distance from the first device, coordinates with respect to the first device and/or the environment, and/or any other type of positional information. Additionally, while these are just a few example techniques of how the system(s) may determine the position of the speaker using the sensor data, in other examples, the system(s) may use additional and/or alternative techniques.

In some examples, the system(s) may further process at least a portion of the sensor data using one or more user identification techniques in order to determine an identity of the speaker. For a first example, the system(s) may process the audio data using one or more speaker identification techniques (which are described in more detail herein), where the audio data represents speech from the speaker. Based at least on the processing, the system(s) may determine the identity of the speaker. For a second example, such as if the speaker is located within the FOV of the image sensor(s) and the image(s) again depicts the speaker, the system(s) may process the image data using one or more facial recognition techniques and, based at least on the processing, determine the identity of the speaker. In either of these examples, and as described herein, the system(s) may determine a specific identity of the user, such as a name and/or username associated with the speaker, or the system(s) may determine a general identity for the speaker, such as "User 1," Speaker 1," "Participant 1," and/or any other type of identifier. Additionally, while these are just a few example techniques of how the system(s) may determine the identity of the speaker using the sensor data, in other examples, the system(s) may use additional and/or alternative techniques.

The system(s) may then generate content that includes the information describing the position and/or identity of the speaker. For a first example, the system(s) may generate the content to represent text that indicates the position and/or identity of the speaker. For a second example, the system(s) may generate content that represents the environment surrounding the first device, such as in the form of an image (e.g., a top-down image with the first device located approximately in the middle of the top-down image). The content may then include an indicator (e.g., a shape, a logo, a color, a character, a tag, etc.) associated with the position of the speaker within the environment. While these are just two example types of content that may indicate the information associated with the speaker, in other examples, the system(s) may generate additional and/or alternative types of content.

The system(s) may then cause the second device to present the content, such as along with presenting the image(s) represented by the image data and/or outputting the audio represented by the audio data. In some examples, such as when the system(s) is included as part of the first device and/or is remote from the second device, the system(s) may cause the second device to present the content by sending the content along with the image data and/or the audio data to the second device. In some examples, such as when the system(s) is included as part of the second device, the system(s) may cause the second device to present the content by causing the second device to display the content along with the displaying of the image(s) and/or the outputting of the audio. In any of the examples, by causing the content to be presented along with the presenting of the image(s) and/or the outputting of the audio, one or more users associated with the second device are able to identity the speaker even when the speaker is not depicted by the image(s).

In some examples, the system(s) may continue to perform these processes using new sensor data generated using the sensor(s) of the first device in order to (1) update the position of the speaker as the speaker keeps speaking and/or (2) provide information associated with a new speaker that begins speaking. Additionally, in some examples, the system(s) may perform similar processes using sensor data generated using one or more sensors of the second device in order to provide information associated with one or more users of the second device that are speaking. Furthermore, in some examples, the system(s) may perform similar processes using sensor data generated using the sensor(s) of the first device and/or the sensor(s) of the second device in order to provide information associated with multiple users that may be speaking at a single instance in time.

As further described herein, in some examples, the system(s) may be configured to monitor a session associated with an application in order to determine whether a user is interacting with the application during the session. As described herein, the user may be interacting with the application by providing input (e.g., speech input, physical input, etc.); watching, listening, or otherwise experiencing content presented during the session; waiting for an event to occur with respect to the session (e.g., waiting for other users to join and/or meet at a given location); and/or performing any other type of interaction associated with the application and/or content of the application. To monitor the session, the system(s) may process the sensor data received from a user device.

For a first example, if the sensor data includes image data representing one or more images, then the system(s) may process the image data (e.g., using one or more of the processes described herein) and, based at least on the processing, determine that the user is interacting with the application based at least on the image(s) depicting the user or determine that the user is not interacting with the application based at least on the image(s) not depicting the user. In such an example, the system(s) may perform additional processes to determine whether the user is actually interacting with the application, such as by determining that a gaze associated with the user is directed towards the content (e.g., towards the user device) associated with the application. For a second example, if the sensor data includes audio data, the system(s) may process the audio data (e.g., using one or more of the processes described herein) and, based at least on the processing, determine that the user is interacting with the application based at least on the audio data representing speech from the user or determine that the user is not interacting with the application based at least on the audio data not representing speech from the user.

For a third example, if the sensor data includes location data, the system(s) may process the location data (e.g., using one or more of the processes described herein) and, based at least on the processing, determine that the user is interacting with the application based at least on the location data indicating the presence of the user (e.g., within a threshold distance to the user device) or determine that the user is not interacting with the application based at least on the location data not indicating the presence of the user (and/or indicating that the presence is outside of the threshold distance to the user device). Still, for a fourth example, if the sensor data includes input data, the system(s) may process the input data (e.g., using one or more of the processes described herein) and, based at least on the processing, determine that the user is interacting with the application based at least on the input data representing one or more inputs from the user or determine that the user is not interacting with the application based at least on the input data not representing inputs from the user. In some examples, the system(s) may combine one or more of these techniques when determining whether the user is interacting with the application.

In some examples, the system(s) may further determine whether a specific user is interacting with the application. For instance, if a specific user is initially interacting with the application, but other users are located proximate to the user device (e.g., in the same environment as the user device), then the system(s) may determine whether it is the specific user or another user that is interacting with the application during the session. For example, and again if the sensor data includes image data, the system(s) may determine whether a user that is depicted by the image(s) includes the specific user or another user.

The system(s) may then perform one or more processes based at least on whether the user (and/or the specific user) is interacting with the application. For instance, if the system(s) determines that the user is not interacting with the application, then the system(s) may start a timer. The system(s) may then determine to terminate the session with the user if the timer indicates that the user still is not interacting with the application for a threshold period of time or determine to continue the session with the user is the user begins to interact with the session before the timer indicates the threshold period of time. As described herein, a threshold period of time may include, but is not limited to, one minute, five minutes, ten minutes, and/or any other period of time. In some examples, the system(s) may initially provide a notification before terminating the session. For example, the system(s) may provide the user with a warning after a different, shorter threshold period of time has elapsed without the user interacting with the application.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example of a process 100 of providing spatial information for a conversational application, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include generating image data 102 using one or more image sensors 104 (e.g., one or more cameras), audio data 106 using one or more microphones 108, and/or location data 110 using one or more location sensors 112 (e.g., one or more LiDAR sensors, one or more ultrasonic sensors, one or more RADAR sensors, one or more time-of-flight sensors, etc.). For instance, the image sensor(s) 104, the microphone(s) 108, and/or the location sensor(s) 112 may be included as part of a first device that is being used by one or more first users to communicate with one or more second users using a second device. As described herein, a device may include, but is not limited to, a laptop, a computer, a television, a phone, a tablet, and/or any other type of device that a user may use to communicate. As such, the image data 102 may represent one or more images (e.g., a video) depicting one or more of the first user(s), the audio data 106 may represent user speech from one or more of the first user(s), and the location data 110 may represent location information for one or more of the first user(s).

Figure 2A:
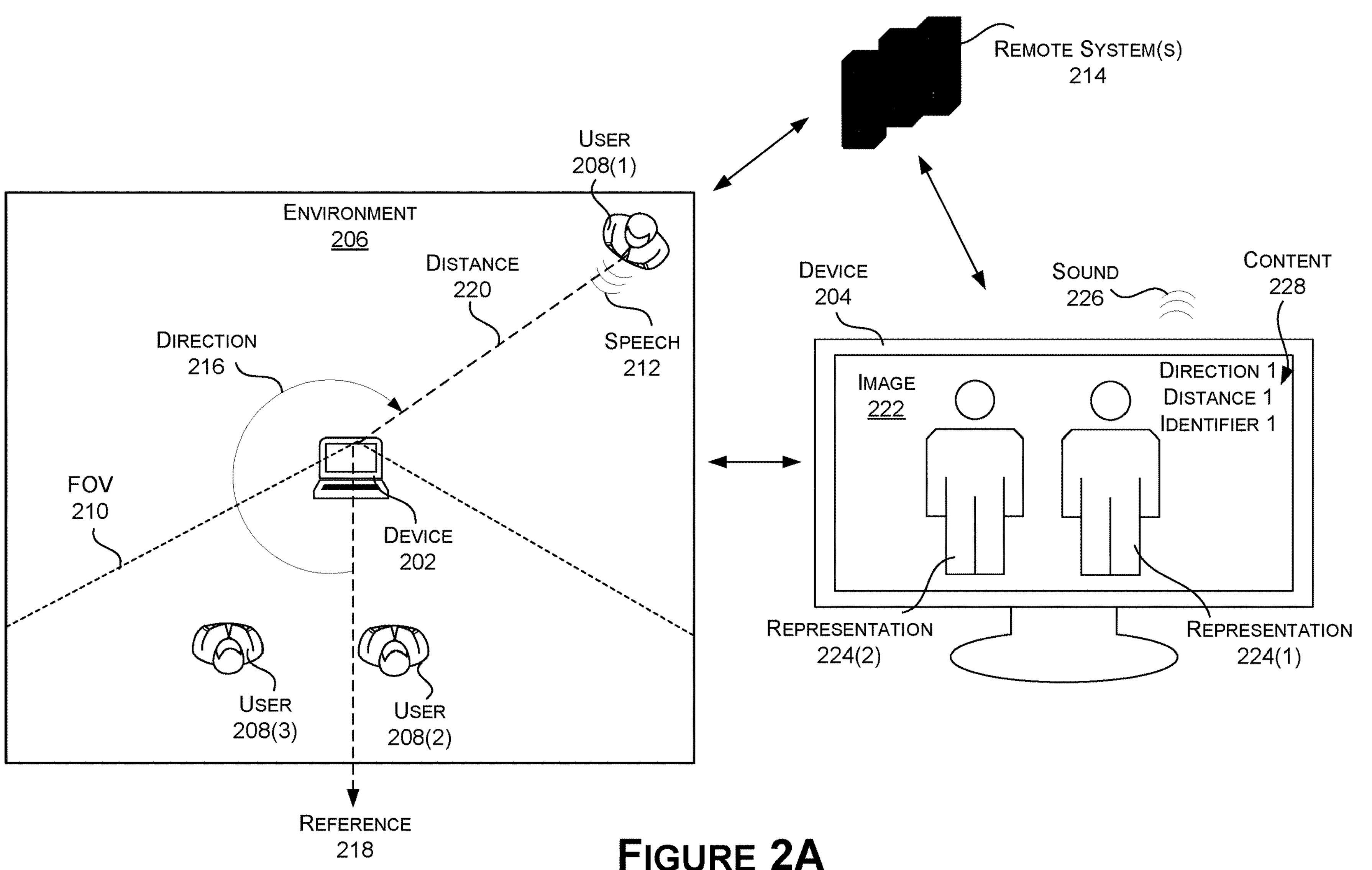
FIGS. 2A-2C illustrate examples of a first device providing spatial information to a second device during a video conference, in accordance with some embodiments of the present disclosure.

For instance, FIG. 2A illustrates a first example of a first device 202 (e.g., a first client device 1400, a first computing device 1400, etc.) communicating with a second device 204 (e.g., a second client device 1400, a second computing device 1400, etc.) during a video conference, in accordance with some embodiments of the present disclosure. As shown, the first device 202 may be located within an environment 206 that includes users 208(1)-(3) (also referred to singularly as "user 208" or in plural as "users 208"). The first device 202 may include an image sensor (e.g., the image sensor(s) 104) that has a field-of-view (FOV) 210 of a portion of the environment 206, such as the portion of the environment 206 that is located in front of the first device 202. As such, image data (e.g., the image data 102) generated using the image sensor may represent the second user 208(2) and the third user 208(3) that are located within the FOV 210, but may not represent the first user 208(1) that is located outside of the FOV 210.

Additionally, the first device 202 may include one or more microphones (e.g., the microphone(s) 108) that generate audio data (e.g., the audio data 106) representing at least speech from the users 208. As such, at a time instance that is associated with the example of FIG. 2A, the audio data may represent speech 212 from the first user 208(1). In some examples, the first device 202 may further include one or more location sensors (e.g., the location sensor(s) 112) that generate location data (e.g., the location data 110) representing the locations of the users 208 within the environment 206. However, in other examples, the first device 202 may not include the location sensor(s).

Referring back to the example of FIG. 1, process 100 may include a location component 114 using at least a portion of the image data 102, at least a portion of the audio data 106, and/or at least a portion of the location data 110 to determine a position of a user that is speaking, where the position may be relative to a device and/or the environment. As described herein, the location component 114 may be included as part of the device that generates the image data 102, the audio data 106, and/or the location data 110 (e.g., the first device 202), a device that is providing content associated with the image data 102, the audio data 106, and/or the location data 110 (e.g., the second device 204), and/or one or more remote systems (e.g., a cloud-based system) that communicates data between the devices (e.g., a remote system(s) 214). Additionally, the location component 114 may use various techniques to determine the position of the speaker based at least on the image data 102, the audio data 106, and/or the location data 110.

For a first example, the location component 114 may process at least a portion of the audio data 106 using one or more acoustic source location techniques in order to determine the position of the speaker relative to the device and/or within the environment. As described herein, a location technique may include, but is not limited to, a steered beamformer approach (e.g., beamformer-based sound localization, etc.), a holography approach, a collocated microphone array approach (e.g., acoustic vector array, advanced microphone array, multiple microphone array, etc.), a scanning approach, a learning method for binaural hearing approach, a cross-power spectrum phase analysis approach, a hierarchical fuzzy artificial neural networks approach, a single microphone approach, and/or any other technique that is capable of using sound to determine positions of speakers.

For instance, and with regard to beamforming, the location component 114 may determine characteristics associated with sound as captured by the microphones 108, such as times of arrival, sound frequencies, sound strengths, and/or any other characteristic. The location component 114 may then use the characteristics to determine the position associated with a source of the sound, such as the speaker. For instance, the location component 114 may use the time(s) of arrival of the sound associated with the microphones, along with the locations and/or orientations of the microphones 108 with respect to one another, to determine the direction of the speaker with respect to the device (e.g., with respect to the microphones 108) and/or the distance of the speaker with respect to the device.

For a second example, the location component 114 may process at least a portion of the location data 110 using one or more techniques in order to determine the position of the speaker, where the position may be relative to the device and/or the environment. For instance, and for a user, the location data 110 may represent at least a direction of the user relative to the device (e.g., relative to the location sensor(s) 112) and a distance of the user relative to the device. In some examples, such as when there are multiple users within the environment and/or around the device, the location component 114 may determine a respective position for one or more (e.g., each) of the users. In such examples, the location component 114 may then determine which user is speaking so that the location component 114 may determine the position of the speaker. For instance, the location component 114 may use one or more of the acoustic source location techniques described herein to determine an initial position of a speaker and then use the location data 110 to refine the initial position to a more exact position of the speaker.

For a third example, the location component 114 may process at least a portion of the image data 102 using one or more techniques in order to determine the position of the speaker, where the position may be relative to the device and/or the environment. For instance, if the image data 102 represents one or more images depicting the speaker, then the location component 114 may determine one or more portions of the image(s) that corresponds to (e.g., depicts) the speaker. The location component 114 may then determine the direction of the speaker relative to the device (e.g., relative to the image sensor(s) 104) and/or the distance of the speaker relative to the device based at least on the portion of the image(s).

For more details, the location component 114 may be preconfigured with data that associates different positions of images with different positions relative to the device (e.g., relative to the image sensor(s) 104). For instance, a first portion of images may be associated with a first direction and/or distance relative to the device, a second portion of images may be associated with a second direction and/or distance relative to the device, a third portion of images may be associated with a third direction and/or distance relative to the device, and/or so forth. As such, if the location component 114 determines that the first portion of the image(s) represented by the image data 102 correspond to (e.g., depict) the speaker, then the location component 114 may determine that the speaker is at the first direction and/or distance relative to the device.

While these are just a few example techniques of how the location component 114 may use the image data 102, the audio data 106, and/or the location data 110 to determine the position of the speaker, in other examples, the location component 114 may use additional and/or alternative techniques. As shown, the location component 114 may then output position data 116 representing at least the position of the speaker.

For instance, and referring back to the example of FIG. 2A, the location component 114 may use the image data, the audio data, and/or the location data generated using the first device 202 to determine a position of the first user 208(1) that is speaking. As shown, the position may include a direction 216 (e.g., an angle) of the first user 208(1) relative to a reference 218 associated with the first device 202 and a distance 220 of the first user 208(1) relative to the first device 202. While the example of FIG. 2A illustrates the reference 218 as being straight in front of the first device 202 (e.g., directly outward from the image sensor), in other examples, the reference 218 may include any other direction with respect to the first device 202. Additionally, while the example of FIG. 2A illustrates the direction 216 as being measured in a clockwise direction with respect to the reference 218, in other examples, the direction 216 may be measured in a counterclockwise direction with respect to the reference 218.

In some examples, the location component 114 may determine the position using one or more additional and/or alternative techniques. For instance, in addition to, or alternatively from, determining the position as including the direction 216 and/or the distance 220, the location component 114 may determine the position as including coordinates relative to the environment 206 and/or the first device 202. For instance, the location component 114 may determine the position as including a x-coordinate location, a y-coordinate location, and/or a z-coordinate location relative to the first device 202 and/or the environment 206. In any example, the location component 114 may then generate and/or output position data (e.g., position data 116) representing the position of the first user 208(1) relative to the first device 202 and/or the environment 206.

Referring back to the example of FIG. 1, process 100 may include an identifier component 118 using at least a portion of the image data 102, at least a portion of the audio data 106, and/or at least a portion of the location data 110 to determine an identity of the speaker. As described herein, the identifier component 118 may be included as part of the device that generates the image data 102, the audio data 106, and/or the location data 110 (e.g., the first device 202), a device that is providing content associated with the image data 102, the audio data 106, and/or the location data 110 (e.g., the second device 204), and/or one or more remote systems (e.g., a cloud-based system) that communicates data between the devices (e.g., the remote system(s) 214).

In some examples, the identifier component 118 may determine a specific identifier for the speaker, such as when the identifier component 118 is preprogrammed with information associated with the speaker. For example, the identifier component 118 may be preprogrammed with a profile associated with the speaker, wherein the profile associates biometric data (e.g., facial recognition data, voice recognition data, etc.) with the specific identifier of the speaker. In such examples, the speaker needs to provide consent for storing the biometric data. Additionally, the specific identifier may include, but is not limited to, a name of the speaker, a username associated with the speaker, and/or any other type of identifier provided by the speaker.

Additionally, or alternatively, in some examples, the identifier component 118 may determine a general identifier for the speaker, such as when the identifier component 118 is not preprogrammed with information associated with the speaker. As described herein, the general identifier may generally identify the speaker, such as User 1, Speaker 1, Participant 1, and/or so forth. Additionally, the identifier component 118 may determine a different general identifier for one or more (e.g., each) of the users identified by the identifier component 118. For example, the identifier component 118 may determine that a first user includes a general identifier of User 1, a second user includes a general identifier of User 2, a third user includes a general identifier of User 3, and/or so forth.

For a first example of identifying the speaker, the identifier component 118 may process at least a portion of the audio data 106 using one or more techniques in order to identify the speaker. For instance, in some examples, the identifier component 118 may store data associated with one or more users, such as in one or more databases. The data for a user may include, but is not limited to, audio data representing one or more spoken utterances from the user. The identifier component 118 may then compare a spoken utterance as 15epressented by the audio data 106 to the stored spoken utterances. Based at least on the comparing, the identifier component 118 may (1) determine that the spoken utterance is associated with (e.g., matches, is similar to, etc.) a stored spoken utterance and use the association to determine the identity of the speaker (e.g., based on which user is associated with the stored spoken utterance) or (2) determine that the speaker is a new user (e.g., based on not identifying an association). Additionally, in some examples, the identifier component 118 may perform speaker diarization which includes performing these processes by partitioning the audio data 106 into time-stamped portions and then identifying a speaker associated with one or more (e.g., each) of the audio data 106 portions.

Figure 3:
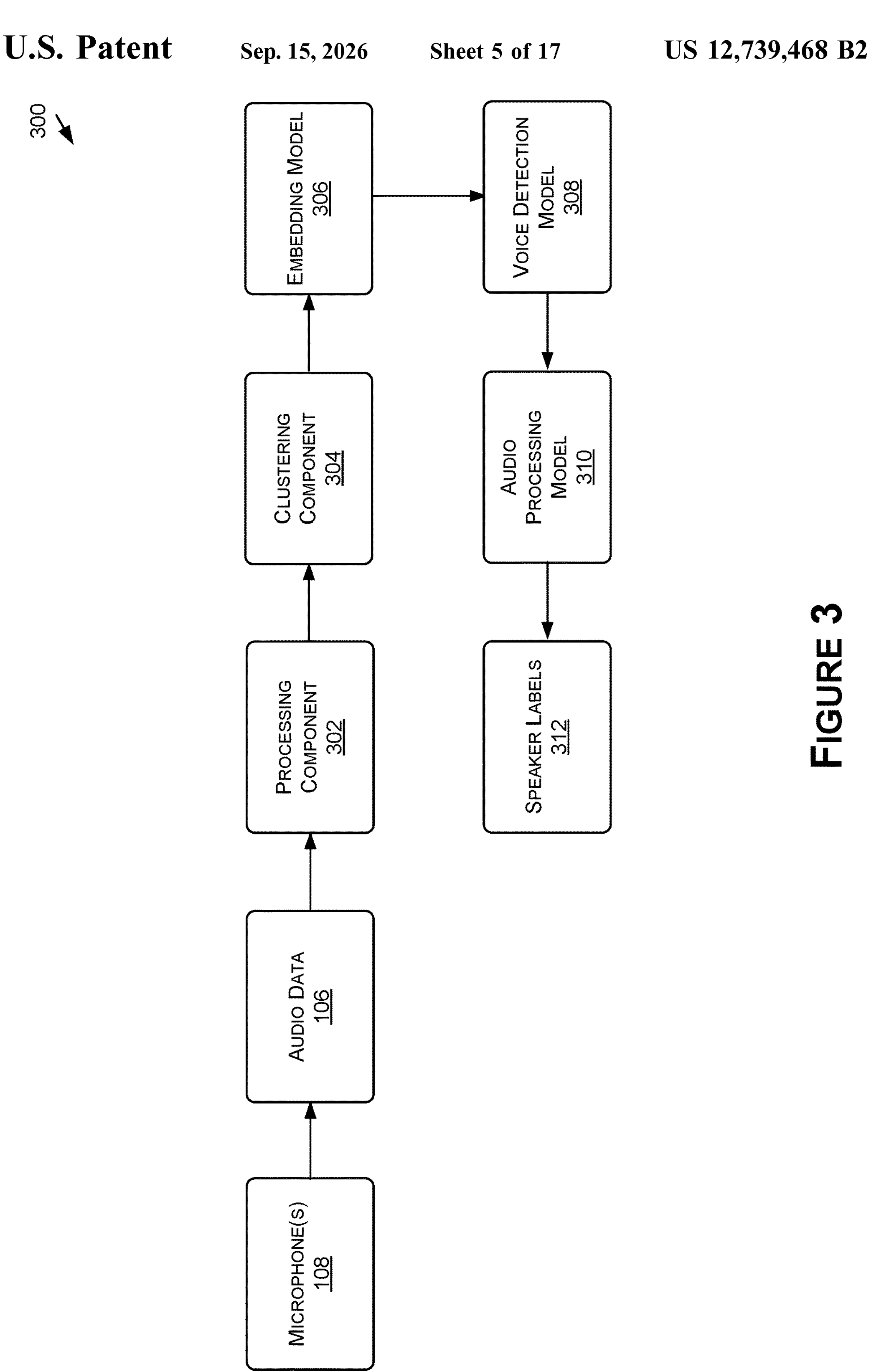
FIG. 3 illustrates an example of a process for performing efficient speaker identification, verification, and/or diarization, in accordance with some embodiments of the present disclosure.

For more details, FIG. 3 illustrates an example of a process 300 for performing efficient speaker identification, verification, and/or diarization, in accordance with some embodiments of the present disclosure. As shown, the process 300 may include the microphone(s) 108 generating the audio data 106. As described herein, the audio data 106 may be generated, e.g., spoken, by a single speaker or multiple speakers and may include a single speech episode or multiple speech episodes. The speaker(s) may be moving (e.g., while talking) across any appropriate space, which may include one or multiple rooms or outdoor spaces. As such, the audio data 106 may represent not only a speech signal but also background noise, interference signals, e.g., emitted by TV devices, radio devices, alarm devices, and/or any other equipment, or sounds naturally occurring (e.g., sound of wind, birds, etc.).

The audio data 106 may then undergo speech preprocessing and segmentation using a processing component 302. For example, preprocessing may include audio filtering, denoising, amplification, dereverberation, and/or any other suitable enhancement. Preprocessing may further include removal of portions of the audio data 106 that do not have speech content. For example, preprocessing may evaluate energy e(t) associated with the audio data 106 as a function of time and identify regions that have energy less than a certain threshold (e.g., an empirically determined noise threshold). Such identified regions may be removed (trimmed) from the audio data 106 during speech preprocessing. Segmentation may include segmenting the audio data 106 into intervals of a predetermined sizes (durations), t. Such intervals are sometimes referred to as utterances herein. It should be understood that utterances need not correspond to a complete logical unit of speech and may encompass one or more sentences, one or more words, a part of a word, one or more exclamations, filler words, pauses, and/or the like. In some examples, the utterances (intervals) may be at least partially overlapping.

Individual utterances may be represented by a plurality of frames, e.g., T frames over a certain predetermined interval of time. Frames may have a duration of 15 msec, 20 msec, 30 msec, and/or some other duration. Frames may undergo a suitable frame-to-spectrogram transformation. For example, a spectrogram of a frame may be obtained or generated by performing the discrete Fourier transform of acoustic energy e(t) or air pressure p(t) associated with a specific utterance. The obtained spectrograms $e(f_i)$ may be defined for a number of bands $f_1, f_2 \ldots f_C$, for example, for C=80 bands or C=128 bands, or any other number of bands. In some examples, the bands may be mel-bands and the spectrograms may be mel-spectrograms.

In some examples, spectrograms may be used to perform channel clustering using a clustering component 304. More specifically, a set of one or more (e.g., n) spectrograms associated with a particular timestamp to may be selected for a given channel. In some examples, the number n may be large enough for the spectrograms to cover an interval of audio that is sufficiently long to include one or more complete words, e.g., 0.5-5 sec, though the interval may be shorter than 0.5 sec or longer than 5 sec, in some example. Channel clustering may include evaluating acoustic similarity of $N_0$ of such sets, e.g., by computing an $N_0 \times N_0$ acoustic similarity matrix (coherence matrix) S, although referred to as similarity matrix herein, for brevity. An element $S_{jk}$ of the similarity matrix S may characterize a similarity between the spectrograms of channel j and spectrograms of channel k. Matrix S may be constructed by computing expectation values $\varepsilon\{e_j(f)e_k(f)\}$ for the spectrograms e(f) of the acoustic energy e(t). For example, the expectation values may be computed as the sum, $$E\{e_j(f)e_k^*(f)\} = \frac{1}{C}\sum_i e_j(f_i)e_k^*(f_i),$$

over C individual frequencies $f_i$ of the spectrograms, e.g., if the expectation values are computed for individual spectrograms. In those instances where similarities of sets of n spectrograms are being determined, n sums over the set $\{f_i\}$ of frequencies for the pairs of spectrograms corresponding to the same timestamps may be computed.

The N combined channels may be processed by a suitable embeddings model 306 that applies a sliding window to the channel audio data 106 (which may, but need not be, the same sets of n spectrograms or frames as used in channel clustering). The embedding model 306 represents the audio data 106 in the sliding window via embeddings (feature vectors) that capture audio features of the audio data 106, e.g., spectral features, cadence, volume, and/or the like. An embedding may be understood as any suitable digital representation of an input data, e.g., as a vector (string) of any number D of components, which can have integer values or floating-point values. Embeddings can be considered as vectors or points in a D-dimensional embedding space. The dimensionality D of the embedding space (defined as part of the embeddings model 306 architecture) can be smaller than the size of the input data (the sets of audio spectrograms or frames). In some examples, a separate sound embedding (or a separate set of sound embeddings) may represent a given audio spectrograms/frame or a set of predetermined number of audio spectrograms/frames.

The embeddings generated by the embedding model 306 (or channel clustering) may be processed by a voice detection model 306 that determines, for individual embeddings, a likelihood that the respective embeddings are associated with speech (rather than with noise or non-speech sounds). In some examples, such likelihoods may be characterized via probabilities w that are defined on the interval of values [0, 1]. In some examples, the likelihoods may be characterized via logits $$L = \mathrm{Log}\left[\frac{w}{1-w}\right],$$

that are defined on the interval (−∞, ∞) with strongly positive logits L>>1 corresponding to high likelihoods (w≈1) that the respective embedding is associated with an interval of time containing a spoken speech and strongly negative logits L corresponding to low likelihoods (w≈0) of speech and/or high likelihoods of noise. Positive or negative logits L having values around zero characterize embeddings that correspond to intervals where speech cannot be distinguished from noise with much certainty.

The embeddings may then be processed by an audio processing model 310 trained to perform one or more of a speaker identification, speaker verification, diarization, and/or the like. In some examples, the audio processing model 310 identifies speaker labels 312 associating specific temporal intervals of audio data 106 with respective speakers that produced speech of those temporal intervals. In some examples, embedding clustering may be performed to analyze a distribution 18epreings of distinct channels in the embeddings space (e.g., a D-dimensional space of all possible embeddings). Embedding clustering may be performed to eliminate outlier embeddings and keep embeddings that are more similar to each other. Such embeddings can be expected to be representative of actual audio content, as opposed to representing random noise features that have little correlation across different channels. In some examples, embedding clustering may use embeddings of N combined channels as an input. In some examples, the number of channels may first be reduced further, N→Ñ, e.g., by discarding channels whose embeddings are determined, e.g., by voice detection model 308 (e.g., as disclosed above), to represent audio content that contains speech with a low likelihood (e.g., below a minimum predetermined probability).

Embedding clustering may determine a centroid embedding for N (or Ñ) embeddings in the D-dimensional embeddings space and may further compute distances from individual embeddings to the centroid embedding. For example, the centroid embedding can be obtained by averaging N (or N) embeddings. The distances may be Euclidean distances in the embeddings space. Embedding clustering may then select a predetermined number K of embeddings with the lowest distances from the centroid embedding while eliminating N−K (or Ñ−K) embeddings with longer distances from the centroid embedding. In some examples, the number K of aggregated embeddings may be determined by an architecture of audio processing model 310. For example, if the audio processing model 310 has an input layer of neurons with 768 different input channels and individual embeddings are 192-bit long, K=4 embeddings may be aggregated at embedding clustering. The K remaining embeddings may then be aggregated (e.g., concatenated), and the aggregated embeddings may be processed by the audio processing model 310 that performs speaker identification, speaker verification, diarization, and/or the like. In some examples, the audio processing model 310 identifies speaker labels 312 associating specific temporal intervals of audio data 106 with respective speakers that produced speech of those temporal intervals.

Referring back to the example of FIG. 1, in addition to, or alternative from, using the audio data 106 to identify the speaker, in some examples, the identifier component 118 may use at least a portion of the image data 102. For instance, and as described herein, the identifier component 118 may store data associated with users, such as facial recognition data associated with the users. As such, the identifier component 118 may process the image data 102 using the stored data and, based at least on the processing, identity the speaker. For example, the identifier component 118 may determine that the speaker as represented by the image data 102 corresponds to (e.g., matches) a user that is represented by the stored data. Based least on that determination, the identifier component 118 may then use the stored data to determine the identity of the speaker. While this example describes using facial recognition data to identity the speaker, in other examples, the identifier component 118 may use other types of stored visual data, such as data representing clothing associated with users.

Additionally, or alternatively, in some examples, the identifier component 118 may use at least a portion of the location data 110 and/or the determined position of the speaker to identify the speaker. For example, the identifier component 118 may store data that associates users with different positions relative to the device and/or within the environment. As such, after determining the position of the speaker, using one or more of the processes described herein, the identifier component 118 may determine that the position corresponds to one of the stored positions. As described herein, the position may correspond to a stored position based at least on the 19epress19n matching the stored position, the position being within a threshold (e.g., a threshold distance, a threshold angle, etc.) to the stored position, and/or using any other technique. Based at least on determining that the position corresponds to the stored position, the identifier component 118 may then use the stored data to determine that the stored position is associated with a user that is speaking.

While these are just a few example techniques of how the identifier component 118 may use the image data 102, the audio data 106, ad/or the location data 110 to determine the identity of the speaker, in other examples, the identifier component 118 may use additional and/or alternative techniques. As shown, the identifier component 118 may then output identifier data 120 (which may represent, and/or include, the speaker labels 312) representing at least the identifier of the speaker.

The process 100 may include a presentation component 122 using at least a portion of the position data 116 and/or at least a portion of the identifier data 120 in order to generate content representing information associated with at least the speaker. As described herein, the presentation component 122 may be included as part of the device that generates the image data 102, the audio data 106, and/or the location data 110 (e.g., the first device 202), a device that is providing content associated with the image data 102, the audio data 106, and/or the location data 110 (e.g., the second device 204), and/or one or more remote systems (e.g., a cloud-based system) that communicates data between the devices (e.g., the remote system(s) 214).

In some examples, the content may include text that indicates the position of the speaker and/or the identifier of the speaker. For a first example, if the position includes a direction and distance associated with the speaker, then the content may include text indicating the direction of the speaker, the distance to the speaker, and/or the identifier of the speaker. For a second example, if the position includes coordinates associated with the speaker, then the content may include text indicating the coordinates and/or the identifier of the speaker. While this is just two examples of information that may be represented by text, in other examples, the text may represent any other information associated with the speaker.

Additionally, or alternatively, in some examples, the content may include an image, such as a top-down image, representing at least a portion of the environment surrounding the device. The image may then include a first indicator that indicates the position of the speaker, one or more second indicators that indicate one or more positions of one or more additional users, and/or a third indicator that indicates the position of the device. As described herein, an indicator may include, but is not limited to, a shape, a logo, a color, a character, a tag, and/or any other type of indicator. In some examples, such as when the image includes indicators for more than one user, the first indicator that indicates the position of the speaker may differ from the second indicator(s) that indicate the position(s) of the other user(s). For example, the first indicator may include a different shape, logo, color, character, tag, and/or the like. This way, the image not only illustrates the positions of the users, but also indicates which of the users includes the speaker.

Additionally, or alternatively, in some examples, the content may include any other type of content that indicates the information (e.g., the position, the identifier, etc.) associated with the speaker. For example, the content may include an image of the speaker, a logo associated with the speaker, and/or the like. The presentation component 122 may then output presentation data 124, where the presentation data 124 may include at least a portion of the image data 102, at least a portion of the audio data 106, at least a portion of the location data 110, and/or content data 126 representing the generated content. The presentation data 124 may then be used to cause another device to present the image(s) represented by the image data 102 and/or output the sound represented by the audio data 106 while also presenting the content represented by the content data 126. The process may then continue to repeat in order to continue determining new positions associated with the speaker and/or new positions associated with one or more new speakers.

For instance, and referring back to the example of FIG. 2A, the second device 204 may present at least an image 222 represented by the image data, where the image 222 includes at least a representation 224(1) of the second user 208(2) and a representation 224(2) of the third user 208(3), while also outputting sound 226 represented by the audio data. As described herein, the sound 226 may correspond to the speech 212 from the first user 208(1). Additionally, the second device 204 may present content 228 indicating information associated with the first user 208(1). For instance, and as shown, the content 228 may include text indicating the direction, the distance, and the identifier associated with the first user 208(1).

Figure 2B:
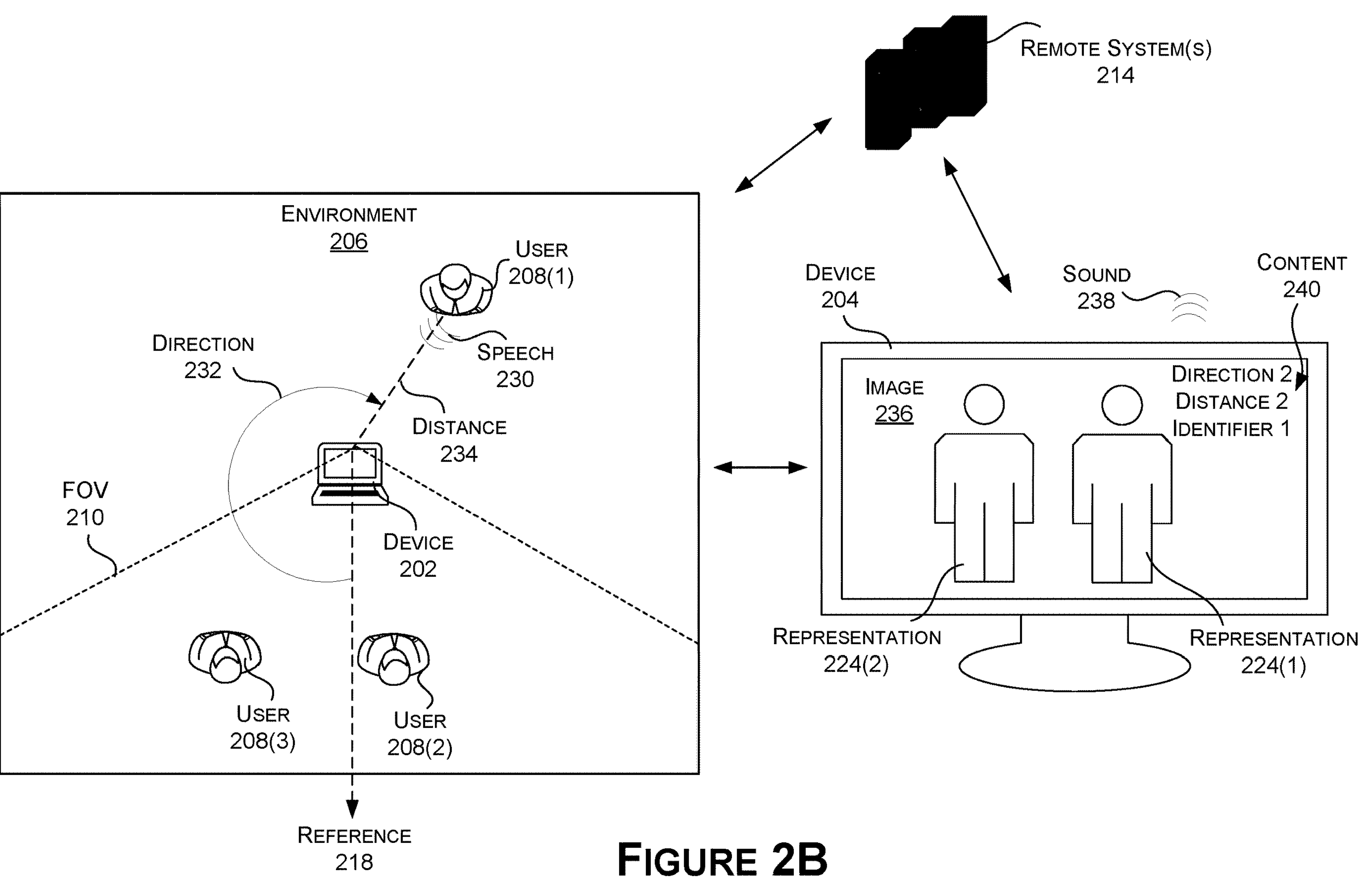

Next, and as illustrated by the example of FIG. 2B, the first user 208(1) may continue to output speech 230, however, the position of the first user 208(1) may change. As such, the location component 114 may determine a new position for the first user 208(1), where the new position includes at least a new direction 232 and a new distance 234 associated with the first user 208(1). The identifier component 118 may also again determine the identifier of the first user 208(1) that is continuing to speak. As such, the second device 204 may present at least an image 236 represented by image data, where the image 236 includes at least the representation 224(1) of the second user 208(2) and the representation 224(2) of the third user 208(3), while also outputting sound 238 represented by audio data. As described herein, the sound 238 may correspond to the speech 230 from the first user 208(1). Additionally, the second device 204 may present content 240 indicating information associated with the first user 208(1). For instance, and as shown, the content 240 may include text indicating the new direction, the new distance, and the identifier associated with the first user 208(1).

Figure 2C:
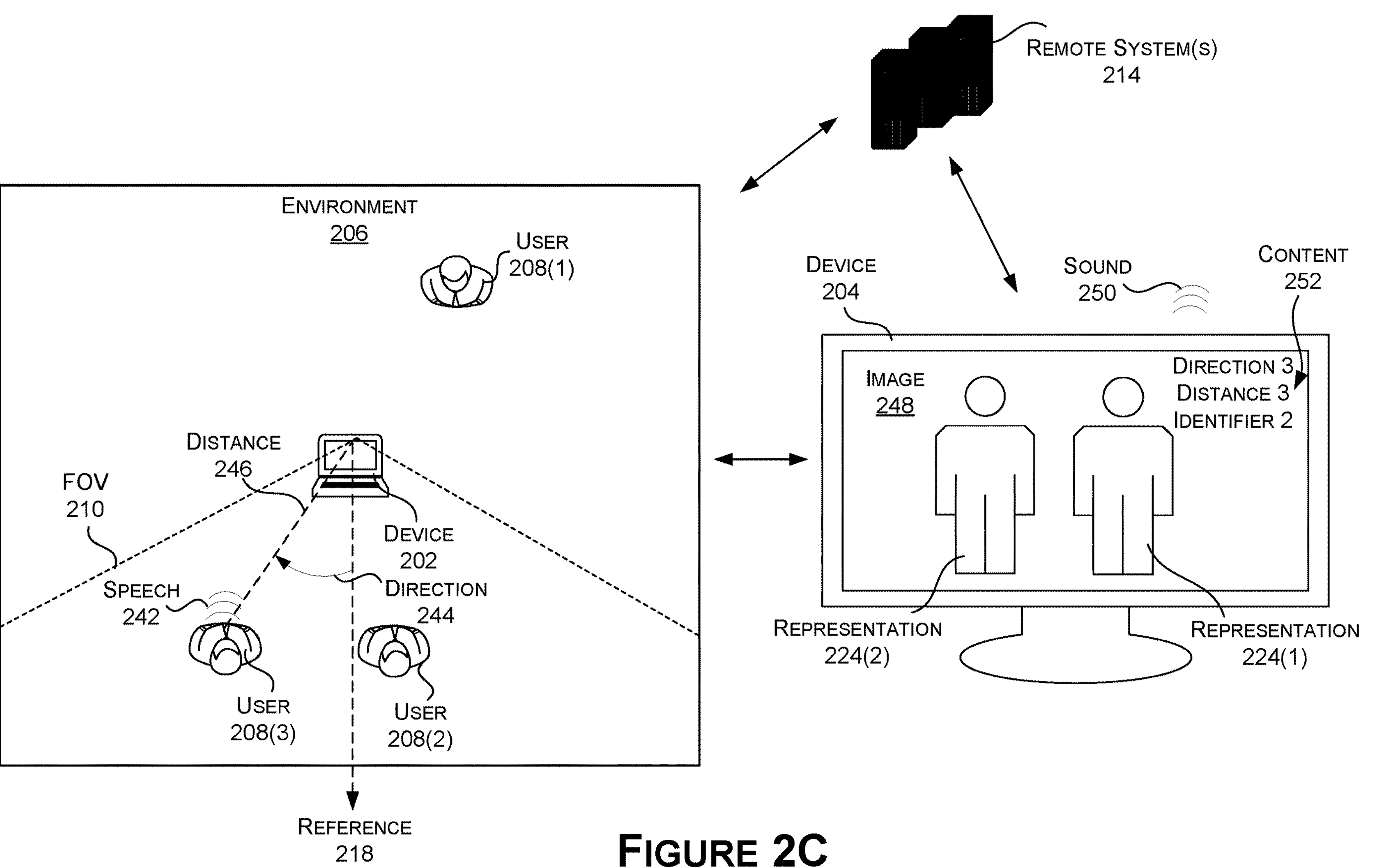

Next, and as illustrated by the example of FIG. 2C, the third user 208(3) may begin to output speech 242. As such, the location component 114 may determine a position for the third user 208(3), where the position includes at least a direction 244 and a distance 246 associated with the third user 208(3). The identifier component 118 may also determine an identifier of the third user 208(3) that is now speaking. As such, the second device 204 may present at least an image 248 represented by image data, where the image 248 includes at least the representation 224(1) of the second user 208(2) and the representation 224(2) of the third user 208(3), while also outputting sound 250 represented by audio data. As described herein, the sound 250 may correspond to the speech 242 from the third user 208(3). Additionally, the second device 204 may present content 252 indicating information associated with the third user 208(3). For instance, and as shown, the content 252 may include text indicating the direction, the distance, and the identifier associated with the third user 208(3).

Figure 4:
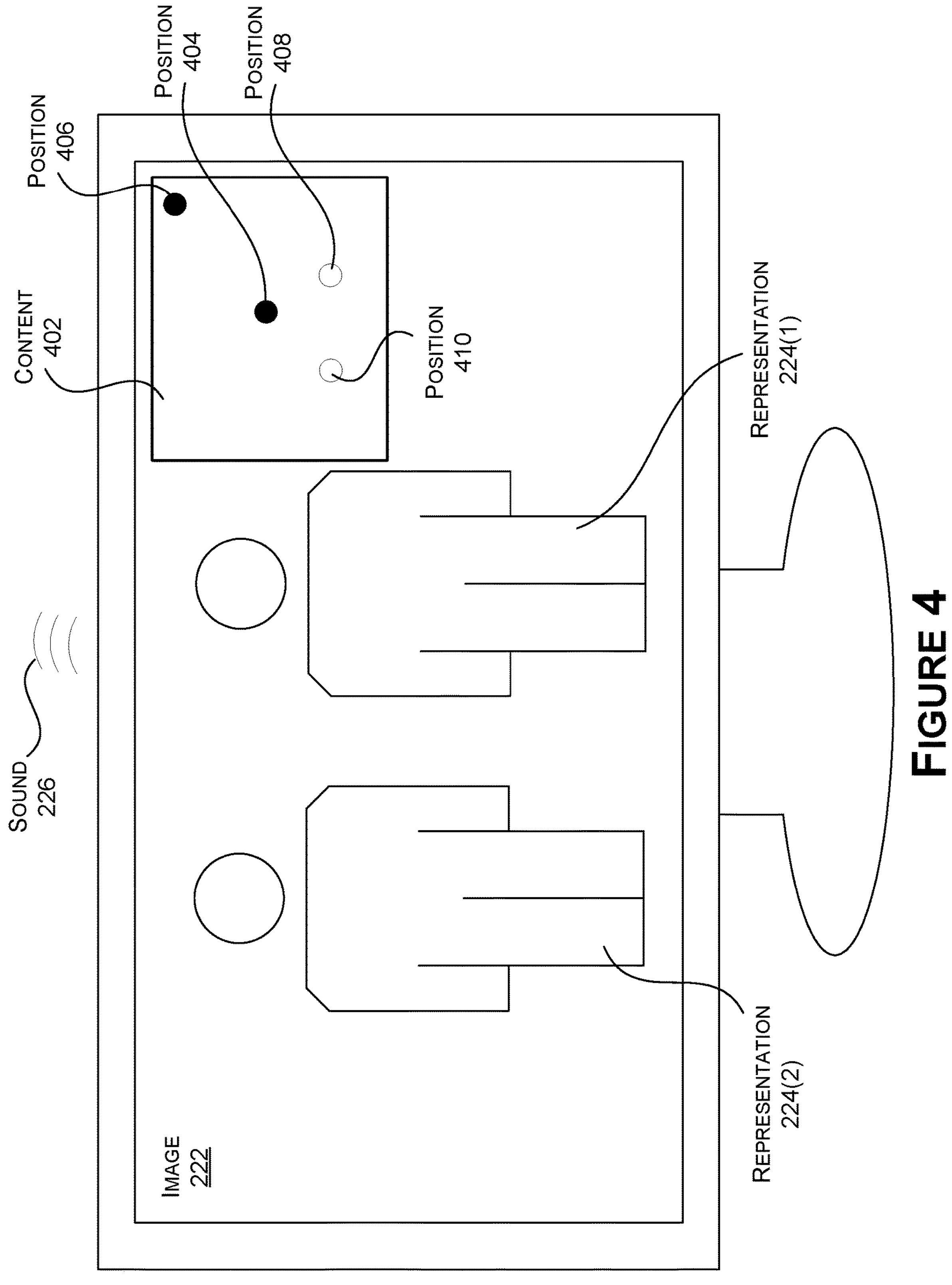
FIG. 4 illustrates an example of a device providing information associated with a speaker during a video conference, in accordance with some embodiments of the present disclosure.

As described herein, in some examples, the presentation component 122 may generate various types of content for providing information associated with one or more users, such as the speaker. For instance, FIG. 4 illustrates an example of the second device 204 providing information associated with a speaker during a video conference, in accordance with some embodiments of the present disclosure. As shown, the example of FIG. 4 may correspond to the example of FIG. 2A where the first user 208(1) is speaking, but includes different content 402 representing the information associated with the first user 208(1).

For instance, and as shown, the content 402 may include an image (e.g., a top-down image) representing the environment 206 for which the first device 202 and/or the users 208 are located. The image also indicates a position 404 associated with the first device 202, a position 406 associated with the first user 208(1), a position 408 associated with the second user 208(2), and a position 410 associated with the third user 208(3). Additionally, an indicator associated with the position 404 includes a first type of indicator, an indicator associated with the position 406 includes a second type of indicator, and indicators associated with the positions 408 and 410 include a third type of indicator. This way, one or more users viewing the content 402 may determine where the first device 202 is located (e.g., by the first type of indicator), where the speaker is located (e.g., by the second type of indicator), and where the other users are located (e.g., by the third type of indicator).

While the example of FIG. 4 illustrates the position 404 associated with the first device 202 as being located substantially at a center of the image, in other examples, the position 404 associated with the first device 202 may be located at another location of the image. Additionally, while the example of FIG. 4 illustrates the indicators as including circles, in other examples, one or more of the indicators may include a different type of indicator, which are described herein.

Figure 5:
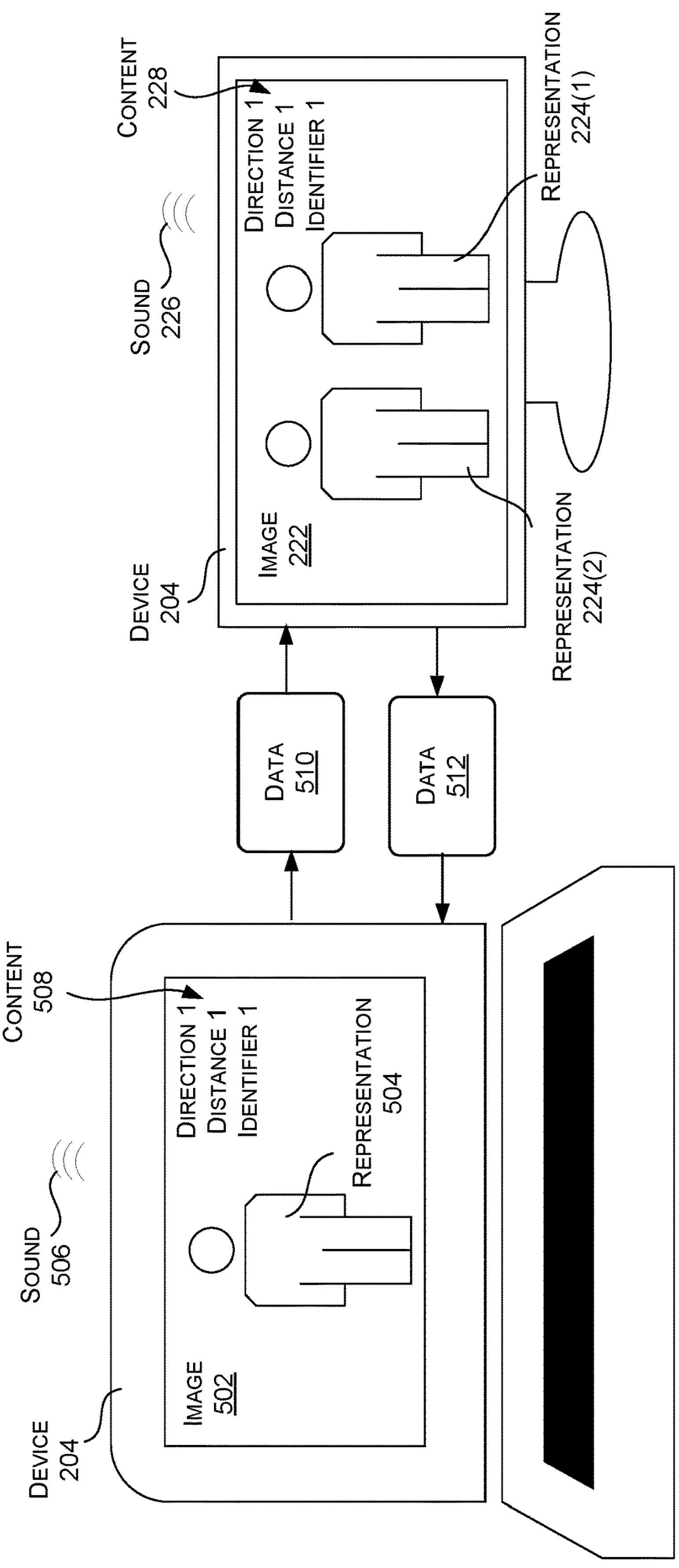
FIG. 5 illustrates an example of devices exchanging spatial information during a video conference, in accordance with some embodiments of the present disclosure.

As further described herein, the spatial content may be provided for many different types of applications, such as video conferencing applications. For instance, FIG. 5 illustrates an example of the first device 202 exchanging spatial information with the second device 204 during a video conference, in accordance with some embodiments of the present disclosure. In some examples, the users 208 may be using the first device 202 to communicate with one or more users of the second device 204 during the video conferencing session.

For instance, the example of FIG. 5 may correspond to the example of FIG. 2A where the first user 208(1) is speaking using the first device 202 while another user is speaker using the second device 204. As such, the second device 204 may be presenting the image 222 and outputting the sound 226 while also presenting the content 228 associated with the first user 208(1) that is speaking. Additionally, the first device 202 may be presenting an image 502 represented by image data generated using the second device 204, where the image 502 depicts at least a representation 504 of a user of the second device 204, while also outputting sound 506 represented by audio data generated using the second device 204. Furthermore, the first device 202 may be presenting content 508 indicating information associated with a speaker of the sound 506.

In some examples, the first device 202 may cause the second device 204 to present the image 222 and the content 228 while outputting the sound 226 by sending data 510 to the second device 204. For instance, the data 510 may include the image data representing the image 222, the audio data representing the sound 226, and/or the content data representing the content 228. Additionally, in some examples, the second device 204 may cause the first device 202 to present the image 502 and the content 508 while outputting the sound 506 by sending data 512 to the first device 202. For instance, the data 512 may include the image data representing the image 502, the audio data representing the sound 506, and/or the content data representing the content 508.

Figure 6:
FIG. 6 illustrates a flow diagram showing a method of providing spatial information along with a video, in accordance with some embodiments of the present disclosure.
Figure 6:
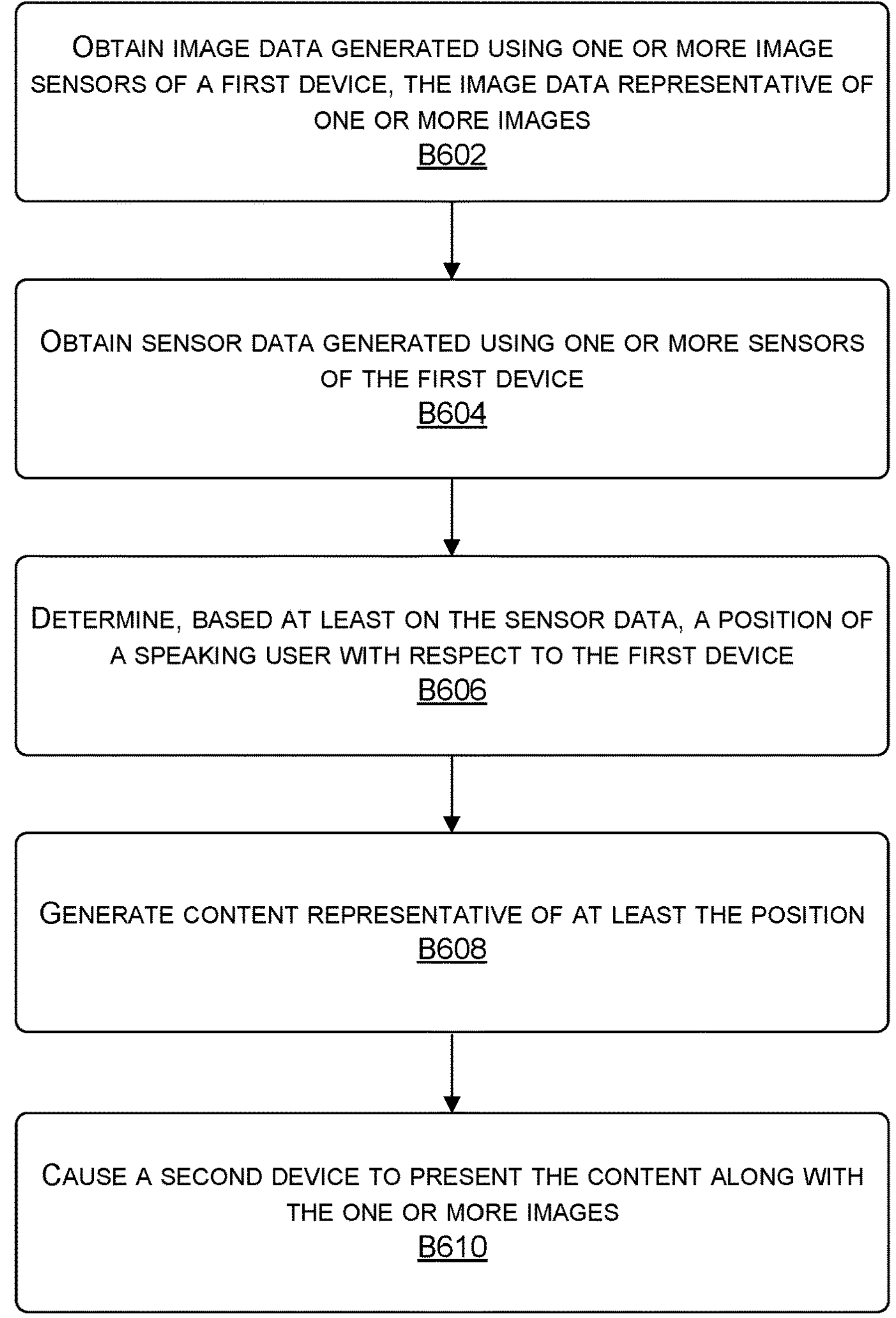
Figure 7:
FIG. 7 illustrates a flow diagram showing a method of generating information associated with a speaker, in accordance with some embodiments of the present disclosure.
Figure 7:
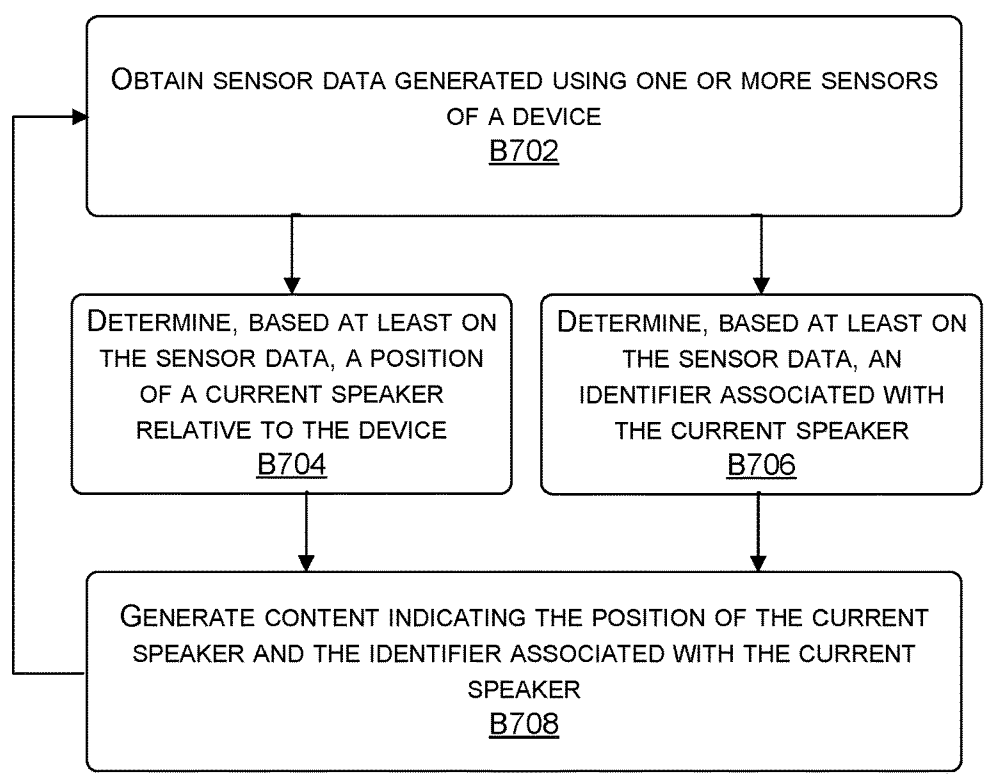
Figure 8:
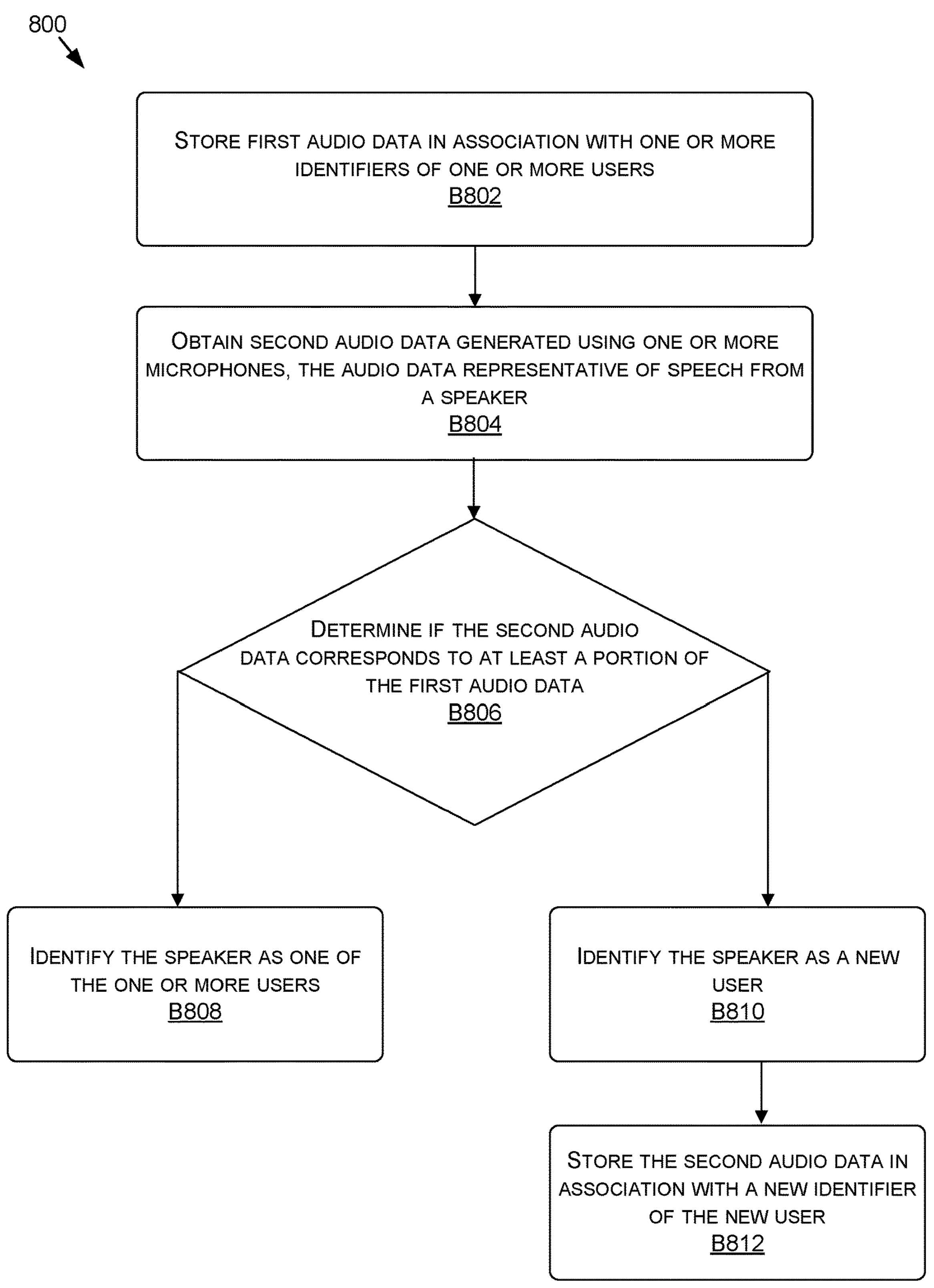
FIG. 8 illustrates a flow diagram showing a method of identifying a speaker using audio data, in accordance with some embodiments of the present disclosure.

Now referring to FIGS. 6-8, each block of methods 600, 700, and 800, described herein, comprises a computing process that may be performed using any combination of hardware, firmware, and/or software. For instance, various functions may be carried out by a processor executing instructions stored in memory. The methods 600, 700, and 800 may also be embodied as computer-usable instructions stored on computer storage media. The methods 600, 700, and 800 may be provided by a standalone application, a service or hosted service (standalone or in combination with another hosted service), or a plug-in to another product, to name a few. In addition, the methods 600, 700, and 800 are described, by way of example, with respect to FIG. 1. However, these methods 600, 700, and 800 may additionally or alternatively be executed by any one system, or any combination of systems, including, but not limited to, those described herein.

FIG. 6 illustrates a flow diagram showing a method 600 of providing spatial information along with a video, in accordance with some embodiments of the present disclosure. The method 600, at block B602, may include obtaining image data generated using one or more image sensors of a first device, the image data representative of one or more images. For instance, the location component 114 may receive the image data 102 generated using the image sensor(s) 104 of the first device (e.g., the first device 202). As described herein, the image data 102 may represent the image(s), where the image(s) depict a portion of an environment that may include a speaker or may not include the speaker.

The method 600, at block B604, may include obtaining sensor data generated using one or more sensors of the first device. For instance, the location component 114 may receive the sensor data generated using the sensor(s). As described herein, in some examples, the sensor data may include audio data 106 generated using the microphone(s) 108, wherein the audio data 106 represents at least speech from the speaker. Additionally, or alternatively, in some examples, the sensor data may include location data 110 generated using the location sensor(s) 112.

The method 600, at block B606, may include determining, based at least on the sensor data, a position of a speaker with respect to the first device. For instance, the location component 114 may use the sensor data (and/or the image data 102) to determine the position of the speaker with respect to the first device. In some examples, such as when the sensor data includes the audio data 106, the location component 114 may determine the position by processing the audio data 106 using one or more acoustic source location techniques. In some examples, such as when the sensor data includes the location data 110, the location component 114 may process the location data 110 to determine the position of the speaker with respect to the first device. As described herein, the position may include, but is not limited to, a direction of the speaker with respect to the first device, a distance of the speaker with respect to the first device, coordinates of the speaker with respect to the first device and/or the environment, and/or any other type of positional information.

The method 600, at block B608, may include generating content representative of at least the position. For instance, the presentation component 122 may use the position data 116 to generate the content to indicate the position. Additionally, in some examples, the presentation component 122 may use the identifier data 120 to generate the content to further indicate an identifier associated with the speaker.

The method 600, at block B610, may include causing a second device to present the content along with the one or more images. For instance, the presentation component 122 may cause the second device (e.g., the second device 204) to present the content along with the image(s). In some examples, such as when the presentation component 122 is included in the first device and/or a remote system, the presentation component 122 may cause the presentation by sending the presentation data 124 that includes the image data 102 and the content data 126 to the second device. In some examples, such as when the presentation component 122 is included in the second device, the presentation component 122 may cause the presentation by causing the second device to display the content along with the image(s).

FIG. 7 illustrates a flow diagram showing a method 700 of generating information associated with a speaker, in accordance with some embodiments of the present disclosure. The method 700, at block B702, may include obtaining sensor data generated using one or more sensors of a device. For instance, the location component 114 and/or the identifier component 118 may receive the sensor data generated using the sensor(s). As described herein, in some examples, the sensor data may include image data 102 generated using the image sensor(s) 104, audio data 106 generated using the microphone(s) 108, location data 110 generated using the location sensor(s) 112, and/or any other type of sensor data generated using any other type of sensor. Additionally, the sensor data may represent information associated with a current speaker, such as speech from the current speaker.

The method 700, at block B704, may include determining, based at least on the sensor data, a position of a current speaker with respect to the device. For instance, the location component 114 may process the sensor data and, based at least on the processing, determine the position of the current speaker with respect to the device. In some examples, such as when the sensor data includes the audio data 106, the location component 114 may determine the position by processing the audio data 106 using one or more acoustic source location techniques. In some examples, such as when the sensor data includes the location data 110, the location component 114 may process the location data 110 to determine the position of the current speaker with respect of the device. As described herein, the position may include, but is not limited to, a direction of the current speaker with respect to the device, a distance of the current speaker with respect to the device, coordinates of the current speaker with respect to the device and/or the environment, and/or any other type of positional information.

The method 700, at block B706, may include determining, based at least on the sensor data, an identifier associated with the current speaker. For instance, the identifier component 118 may process the sensor data and, based at least on the processing, determine the identifier associated with the current speaker. As described herein, the identifier component 118 may determine the identifier of the current speaker using one or more efficient speaker identification, verification, and/or diarization techniques. In some examples, the identifier component 118 may determine a specific identifier for the current speaker, such as when the identifier component 118 is preprogrammed with information associated with the current speaker. Additionally, or alternatively, in some examples, the identifier component 118 may determine a general identifier for the current speaker, such as when the identifier component 118 is not preprogrammed with information associated with the current speaker.

The method 700, at block B708, may include generating content indicating the position of the current speaker and the identifier associated with the current speaker. For instance, the presentation component 122 may generate the content indicating the position of the current speaker with respect to the device and the identifier associated with the current speaker. As shown, the process 700 may then continue to repeat, such as based on the sensor(s) continuing to generate new sensor data (e.g., during a video conferencing call). For instance, the process 700 may continue to repeat at given time intervals such as, but not limited to, every 10 milliseconds, 100 milliseconds, 1 second, 2 seconds, and/or any other time interval.

FIG. 8 illustrates a flow diagram showing a method 800 of identifying a speaker using audio data, in accordance with some embodiments of the present disclosure. The method 800, at block B802, may include storing first audio data in association with one or more identifiers of one or more users. For instance, the identifier component 118 may store the first audio data in association with the identifier(s) of the user(s). As described herein, and for a user, the first audio data may represent at least one or more utterances from the user. Additionally, in some examples, the first audio data 26 represent characteristics associated with a voice of the user, such as a pitch, a tone, a volume, and/or the like.

The method 800, at block B804, may include obtaining second audio data generated using one or more microphones, the second audio data representative of speech from a speaker. For instance, the identifier component 118 may receive the second audio data 106 generated using the microphone(s) 108. As described herein, the second audio data 106 may represent the speech from the speaker.

The method 800, at block B806, may include determining whether the second audio data corresponds to at least a portion of the first audio data. For instance, the identifier component 118 may determine whether the second audio data 106 corresponds to the at least the portion of the first audio data. As described herein, in some examples, the identifier component 118 may determine that the second audio data 106 corresponds to the at least the portion of the first audio data by matching an utterance from the second audio data 106 to an utterance represented by the at least the portion of the first audio data. For instance, the identifier component 118 may match one or more characteristics associated with a voice represented by the second audio data 106 to one or more characteristics associated with a voice represented by the at least the portion of the first audio data.

If, at block B806, it is determined that the second audio data corresponds to the at least the portion of the first audio data, then the method 800, at block B808, may include identifying the speaker as one of the one or more users. For instance, if the location component 114 determines that the second audio data 106 corresponds to the at least the portion of the first audio data, then the location component 114 may use the association between the at least the portion of the first audio data and a user in order to identify the user as the speaker. The presentation component 122 may then use an identifier associated with the identified user to generate content.

However, if, at block B806, it is determined that the second audio data does not correspond to the at least the portion of the first audio data, then the method 800, at block B810, may include identifying the speaker as a new user. For instance, if the location component 114 determines that the second audio data 106 does not correspond to the at least the portion of the first audio data, then the location component 114 may determine that the speaker is the new user. Additionally, the identifier component 118 may generate a new identifier to associated with the new user.

Additionally, the method 800, at block B812, may include storing the second audio data in association with a new identifier of the new user. For instance, the identifier component 118 may store the second audio data 106 in association with the new identifier of the new user. This way, the identifier component 118 may later use the second audio data 106 to again identify the new user.

Figure 9:
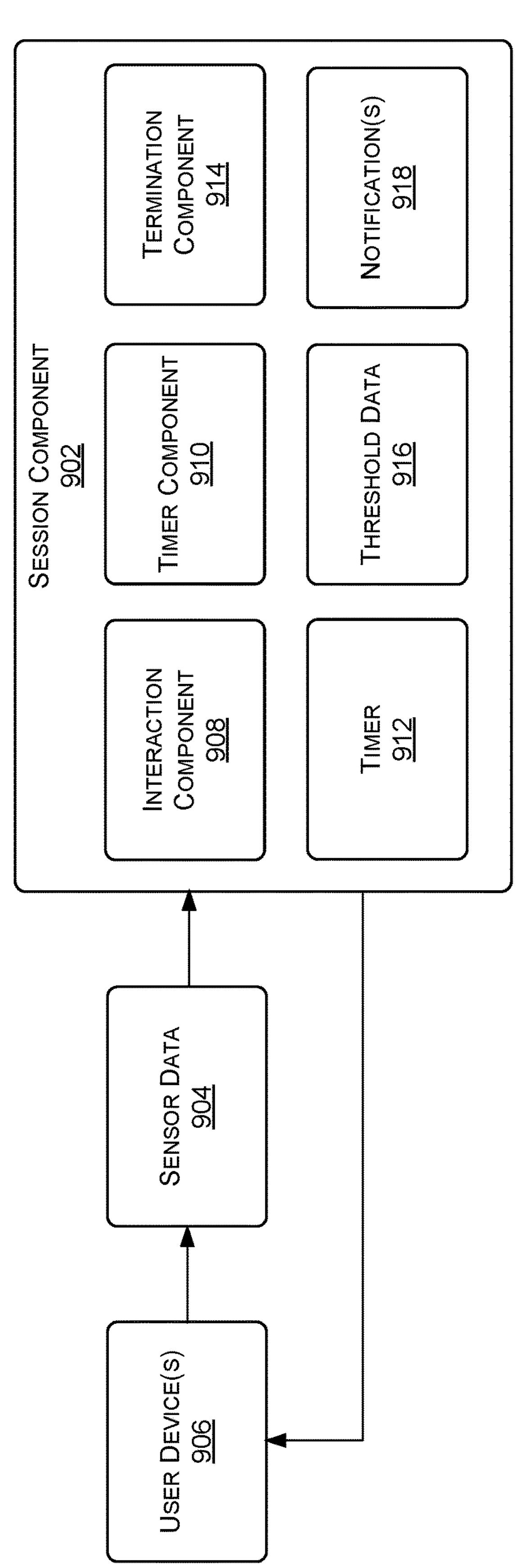
FIG. 9 illustrates an example of a process of monitoring an application session to determine whether a user is interacting with the application, in accordance with some embodiments of the present disclosure.

FIG. 9 illustrates an example of a process 900 of monitoring an application session to determine whether a user is interacting with the application, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 900 may include a session component 902 receiving sensor data 904 from one or more user devices 906 (e.g., a client device 1204). For example, the session component 902 may be included in one of the user device(s) 906 and/or one or more computing devices that are separate from the user device(s) 906 (e.g., an application server(s) 1202, a computing device 1300, a data center 1400, etc.). As described herein, the sensor data 904 may include, but is not limited to, image data, audio data, location data, input data, and/or any other type of sensor data generated using any other type of sensors of the user device(s) 906. In some examples, the user(s) associated with the user device(s) 906 may provide consent for receiving and/or processing at least a portion of the sensor data 904, such as the image data.

The process 900 may include the session component 902 using an interaction component 908 to determine whether a user of a user device 906 is interacting with the application during the session. As described herein, the interaction component 908 may determine whether the user is interacting with the application using at least a portion of the sensor data 904. For instance, in some examples, if the sensor data 904 includes image data representing one or more images, then the interaction component 908 may process the image data (e.g., using one or more of the processes described herein) and, based at least on the processing, determine that the user is interacting with the application based at least on the image(s) depicting the user or determine that the user is not interacting with the application based at least on the image(s) not depicting the user. In such examples, the interaction component 908 may then perform additional processes to determine whether the user is actually interacting with the application.

For a first example, the interaction component 908 may further process the image data using one or more machine learning models, neural networks, algorithms, components, and/or the like associated with gaze detection. The interaction component 908 may then determine that the user is interacting with the application based at least on a gaze direction of the user. For instance, the interaction component 908 may determine that the user is interacting with the application based at least on the gaze direction indicating that the user is focused on the content, such as looking at the user device 906 and/or a display of the user device 906, or determine that the user is not interacting with the application based at least on the gaze direction indicating that the user is not focused on the content, such as by looking away from the user device 906. For a second example, the interaction component 908 may further determine, based at least on processing the image data, that the image(s) depicts an actual user rather than an image of the user and/or another user. In such examples, the interaction component 908 may use any technique to determine that the image(s) depicts an actual user, such as determining that at least a portion of the user moves over a period of time.

Additionally, or alternatively, in some examples, if the sensor data includes audio data, the interaction component 908 may process the audio data (e.g., using one or more of the processes described herein) and, based at least on the processing, determine that the user is interacting with the application based at least on the audio data representing speech from the user or determine that the user is not interacting with the application based at least on the audio data not representing speech from the user. In such examples, the interaction component 908 may perform additional processes to determine whether the user is actually interacting with the application. For example, the interaction component 908 may determine a context associated with the speech and determine whether the context is associated with the application (e.g., whether the context matches the content being provided). For instance, if the user is interacting with another user and not the application, then the interaction component 908 may determine, based at least on a context associated with the speech, that the user is in fact not interacting with the application.

Additionally, or alternatively, in some examples, if the sensor data includes location data, the interaction component 908 may process the location data (e.g., using one or more of the processes described herein) and, based at least on the processing, determine that the user is interacting with the application based at least on the location data indicating the presence of the user or determine that the user is not interacting with the application based at least on the location data not indicating the presence of the user. In such examples, the interaction component 908 may perform additional processes to determine whether the user is actually interacting with the application. For example, the interaction component 908 may determine that the user is interacting with the application based at least on detecting the presence of the user within a threshold distance (e.g., one meter, two meters, five meters, etc.) to the user device 906 or determine that the user is not interacting with the application based at least on detecting the presence of the user outside of the threshold distance to the user device 906.

Additionally, or alternatively, in some examples, if the sensor data includes input data, the interaction component 908 may process the input data (e.g., using one or more of the processes described herein) and, based at least on the processing, determine that the user is interacting with the application based at least on the input data representing one or more inputs from the user or determine that the user is not interacting with the application based at least on the input data not representing inputs from the user. While these are just a few example techniques of how the interaction component 908 may determine whether the user is interacting with the application, in other examples, the interaction component 908 may use additional and/or alternative techniques.

In some examples, the interaction component 908 may use more than one of the techniques described herein to determine whether the user is interacting with the session. For a first example, the interaction component 908 may use both image data and input data to determine whether the user is interacting with the session. This way, even if the user is not providing physical inputs, such as using one or more input devises, but rather watching content associated with the application, the interaction component 908 may still determine that the user is interacting with the application based at least on the image(s) depicting the user. For a second example, the interaction component 908 may use both location data and input data to determine whether the user is interacting with the session. This way, even if the user is again not providing physical inputs, such as using one or more input devises, but rather watching content associated with the application, the interaction component 908 may still determine that the user is interacting with the application based at least on the location data indicating the presence of the user.

In some examples, the interaction component 908 may continuously perform these processes to determine whether the user is interacting with the application as the session component 902 continues to receive the sensor data 904 from the user device 906. In some examples, the interaction component 908 may perform these processes at given time intervals, such as every millisecond, second, five seconds, and/or the like.

In some examples, the interaction component 908 may determine whether a specific user is interacting with the application. For example, the interaction component 908 may determine at least one primary user associated with the application. When the interaction component 908 then determines that a user is interacting with the application, the interaction component 908 may determine whether the user is the primary user or another user (e.g., a person that is just proximate to the user device 906). For a first example, such as if the image(s) depicts the user, then the interaction component 908 may determine whether the user depicted by the image(s) is the primary user or another user using one or more of the processes described herein (e.g., facial recognition). For a second example, such as if the audio data represents speech, then the interaction component 908 may determine whether the speech is from the user or another user using one or more of the processes described herein (e.g., voice recognition, speech recognition, etc.).

The process 900 may include the session component 902 using a timing component 910 to track how long the user is not interacting with the application. For instance, based at least on the interaction component 908 determining that the user (and/or the primary user) is not interacting with the application, the timing component 910 may start a timer 912. The timer component 910 may then cause the timer 912 to continue as long as the interaction component 908 continues to determine that the user is not interacting with the application. For a first example, if the interaction component 908 determines that the user continues to not interact with the application for ten minutes, then the timer component 910 may cause the timer 912 to continue for the ten minutes. For a second example, if the interaction component 908 determines that the user again interacts with the application after five minutes, then the timer component 910 may cause the timer 912 to stop at five minutes. Additionally, in some examples, the timer component 910 may again cause the timer 912 to restart once the interaction component 908 again determines that the user is no longer interacting with the application.

The process 900 may include the session component 902 using a termination component 914 to perform one or more processes based at least on the timer 912. For instance, the termination component 914 may cause the session to terminate for the user based at least on the timer 912 indicating that the user has not interacted with the application for a threshold period of time, where the threshold period of time may be represented by threshold data 916. As described herein, a threshold period of time may include, but is not limited to, one minute, five minutes, eight minutes, ten minutes, and/or any other period of time. Additionally, as described herein, the termination component 914 may perform one or more processes before terminating the session. For example, the termination component 914 may cause a notification 918 to be provided to the user before terminating the session. In some examples, the termination component 914 causes the notification 918 to be provided after another, shorter threshold period of time elapses for which the user is not interacting with the application. For example, if the threshold period of time for terminating the session is eight minutes, then the termination component 914 may cause a notification 918, such as a warning, to be sent to the user device 906 after seven minutes has passed without the user interacting with the application.

In some examples, the termination component 914 may cause the session to terminate by at least causing content associated with the session to no longer be provided to the user device 906. In some examples, the termination component 914 may cause the session to terminate by causing a communicate between the user device 906 and another computing device (e.g., a computing device that is executing the session component 902) to terminate. While these are just a few example techniques of how the termination component 914 may cause the session to terminate, in other example, the termination component 904 may use additional and/or alternative techniques to terminate the session.

Still, in some examples, rather than terminating the session, the termination component 914 may cause the user device 906 and/or the session to switch to a less active state. For instance, in the less active state, less data may be sent to the client device 906, but the session may still stay active for the client device 906.

Figure 10A:
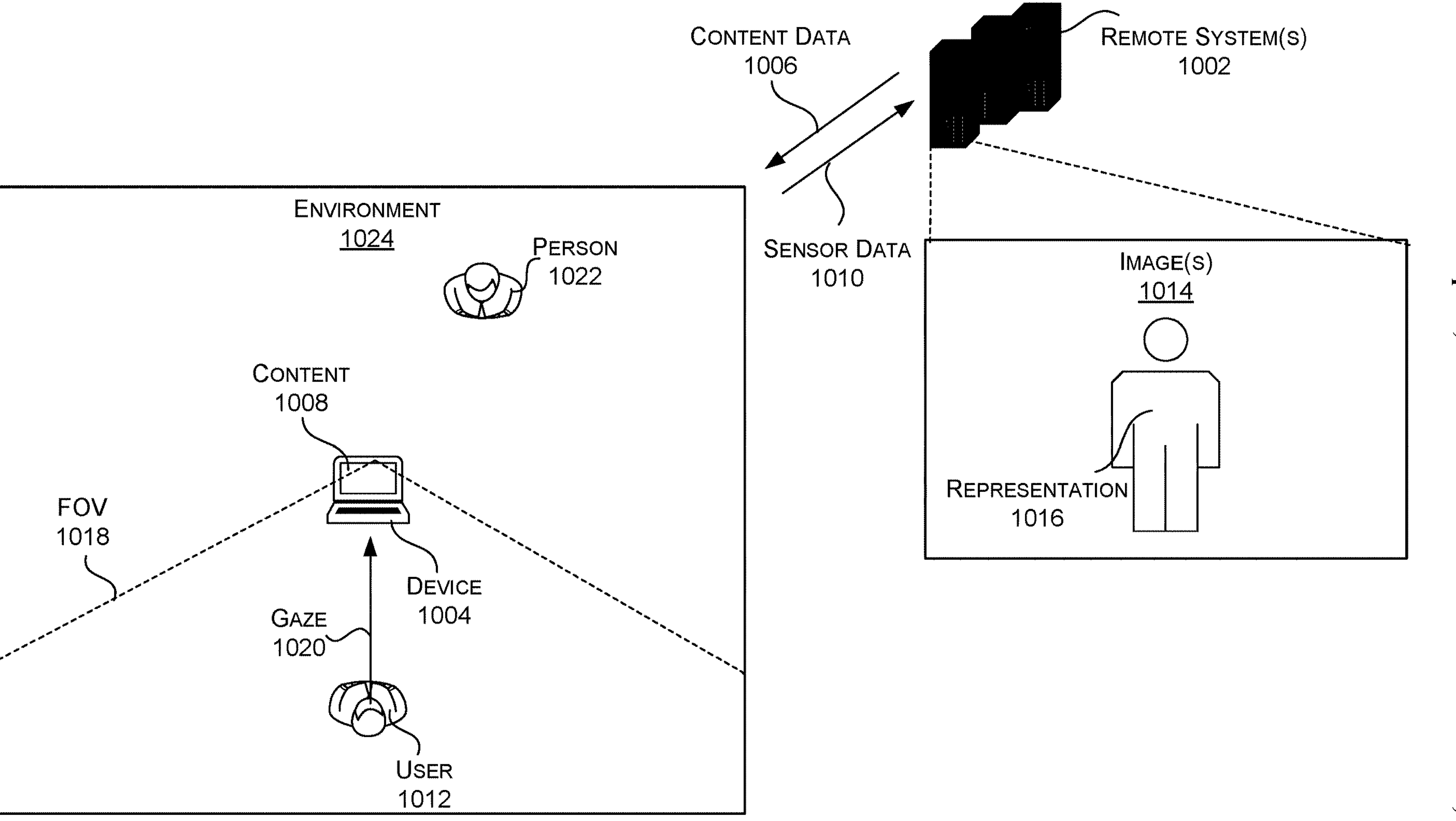
FIGS. 10A-10B illustrate examples of monitoring a session associated with an application for user interactions, in accordance with some embodiments of the present disclosure.
Figure 10B:
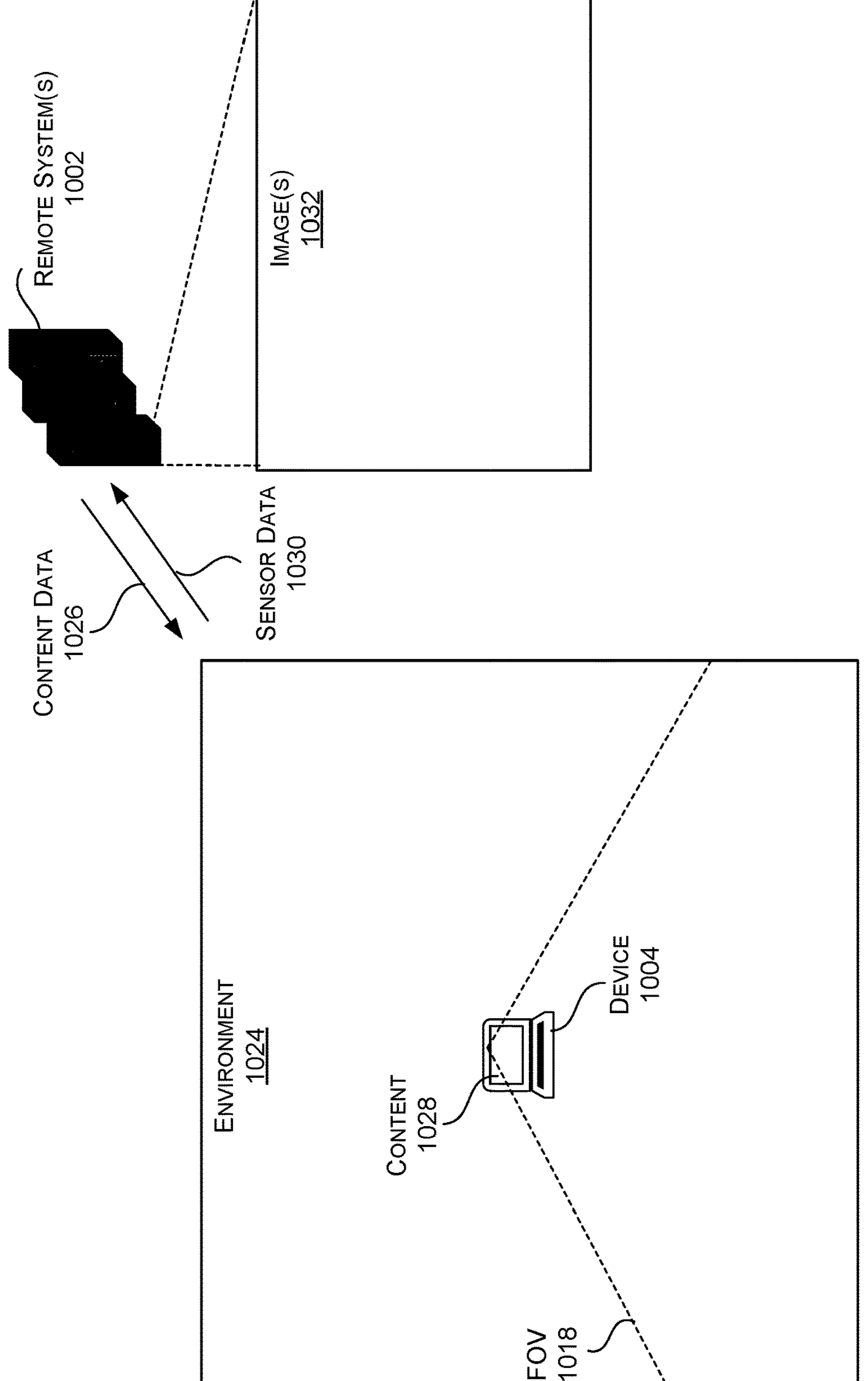

For instance, FIGS. 10A-10B illustrate examples of monitoring a session associated with an application for user interactions, in accordance with some embodiments of the present disclosure. As shown by the example of FIG. 10A, a remote system(s) 1002 (e.g., an application server(s) 1202, a computing device 1300, a data center 1400, etc.) may establish an application session with a user device 1004 (e.g., a user device 106, a client device 1204, etc.). During the session, the remote system(s) 1002 may send content data 1006 to the user device 1004, where the content data 1006 represents at least content 1008 that is displayed by the user device 1004. Additionally, the user device 1004 may send sensor data 1010 (e.g., sensor data 904) to the remote system(s) 1002. As described herein, the sensor data 1010 may include image data, location data, audio data, input data, and/or any other type of sensor data.

The session component 902, which may be executing on the remote system(s) 1002, may then process the sensor data 1010. For instance, the interaction component 908 may process the sensor data 1010, using one or more of the processes described herein, to determine whether a user 1012 is interacting with the content 1008 during the session. For example, and as shown, the interaction component 908 may determine that the user 1012 is interacting with the content 1008 based at least on one or more images 1014 represented by the sensor data 1010 depicting a representation 1016 of the user 1012 (e.g., the user 1012 is within a field-of-view (FOV) 1018 of an image sensor of the user device 1004). In some examples, the interaction component 908 may further determine that the user is interacting with the content 1008 based at least on a gaze direction 1020 associated with the user 1012 being substantially towards the user device 1004 and/or the content 1008. In either example, even though the user 1012 may not be providing physical inputs to the user device 1004, the interaction component 908 is still able to determine that the user 1012 is interacting with the application.

In some examples, and as further illustrated by the example of FIG. 10A, the interaction component 908 may perform one or more of the processes descried herein to determine an identity of the user 1012. For example, the user 1012 may include a primary user associated with the session while another person 1022 located within a same environment 1024 as the user device 1004, but does not include a user associated with the session. As such, the interaction component 908 may use the identity to determine that it is in fact the user 1012 of the session that is interacting with the content 1008 and not another person that is just located proximate to the user device 1004.

Next, and as illustrated by the example of FIG. 10B, the remote system(s) 1002 may continue to send content data 1026 to the user device 1004, where the user device 1004 then presents content 1028 represented by the content data 1026. Additionally, the user device 1026 may continue to send sensor data 1030 to the remote system(s) 1002. The interaction component 908 may then process the sensor data 1030, using one or more of the processes described herein, to determine that the user 1012 is no longer interacting with the content 1028. For example, the interaction component 908 may determine that one or more images 1032 represented by the sensor data 1030 no longer depict the user 1012. Additionally, in some examples, the interaction component 908 may determine that the sensor data 1030 does not represent inputs from the user 1012, speech from the user 1012, and/or a presence of the user 1012.

As such, the timer component 910 may start the timer 912 based at least on the user 1012 no longer interacting with the content 1028. Additionally, the termination component 914 may cause a notification 918 to be sent to the user device 1014 based at least on the timer 912 reaching a first threshold period of time and/or terminate the session with the user device 1004 based at least on the timer 912 reaching a second threshold period of time.

Figure 11:
FIG. 11 illustrates a flow diagram showing a method of monitoring user interactions during an application session, in accordance with some embodiments of the present disclosure.
Figure 11:
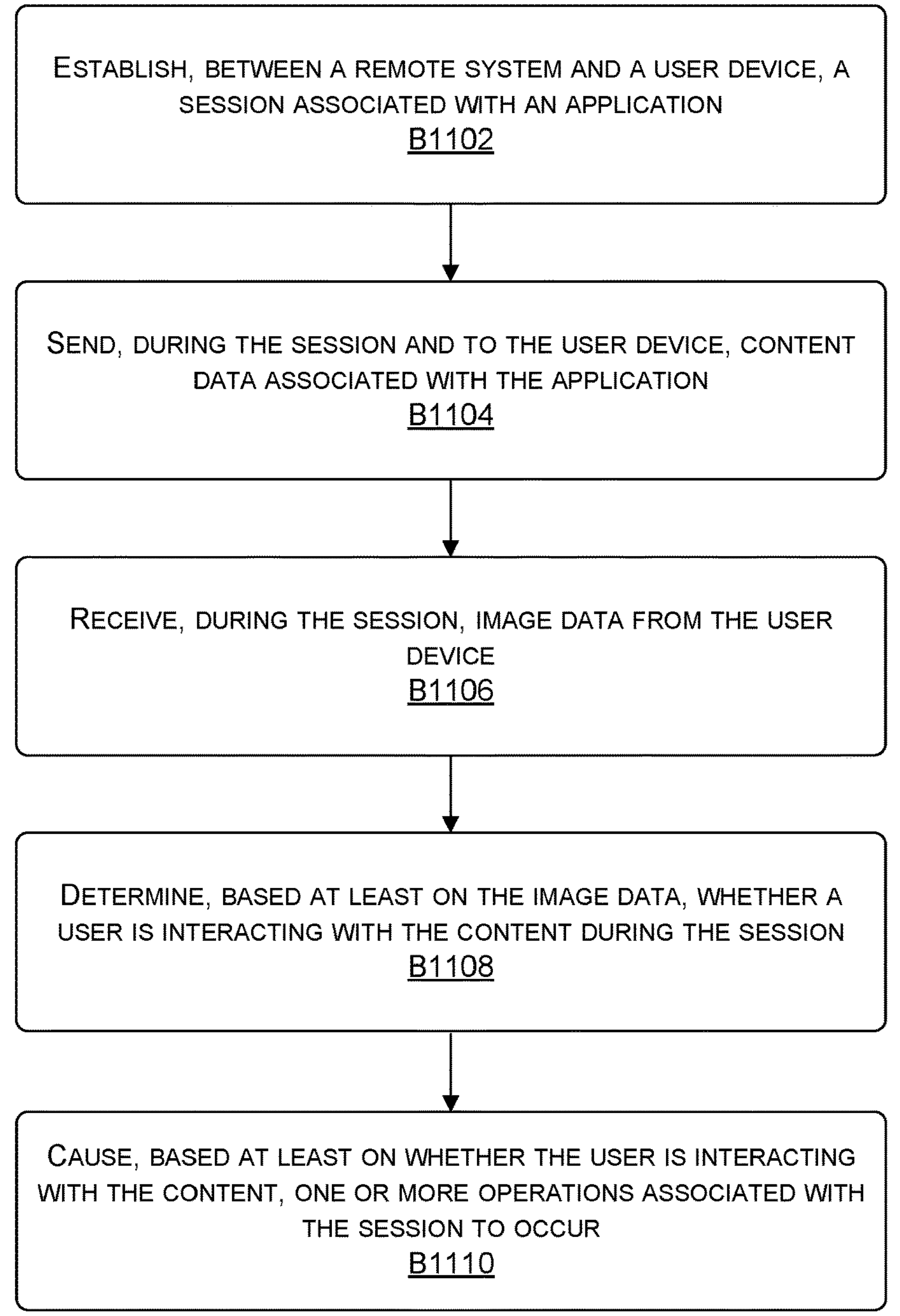

Now referring to FIG. 11, each block of method 1100, described herein, comprises a computing process that may be performed using any combination of hardware, firmware, and/or software. For instance, various functions may be carried out by a processor executing instructions stored in memory. The method 1100 may also be embodied as computer-usable instructions stored on computer storage media. The method 1100 may be provided by a standalone application, a service or hosted service (standalone or in combination with another hosted service), or a plug-in to another product, to name a few. In addition, the method 1100 is described, by way of example, with respect to FIGS. 9-10B. However, this method 1100 may additionally or alternatively be executed by any one system, or any combination of systems, including, but not limited to, those described herein.

FIG. 11 illustrates a flow diagram showing a method 1100 of monitoring user interactions during an application session, in accordance with some embodiments of the present disclosure. The method 1100, at block B1102, may include establishing, between a remote system and a user device, a session associated with an application and the method 1100, at bock B1104, may include sending, during the session and to the user device, content data associated with the application. For instance, the session component 902 may establish a session between the user device 1004 and the remote system(s) 1002. The remote system(s) 1002 may then send the content data 1006 to the user device 1004. As described herein, the content data 1006 may represent content 1008 associated with the application.

The method 1100, at block B1106, may include receiving, during the session, image data from the user device and the method 1100, at block 1108, may include determining, based at least on the image data, whether a user is interacting with the content during the session. For instance, the session component 902 may receive the sensor data 1010 from the user device 1004. The session component 902 (e.g., the interaction component 908) may then process the sensor data 1010, using one or more of the processes described herein, to determine whether the user 1012 is interacting with the content 1008. For example, and as described herein, the session component 902 may determine that the user 1012 is interacting with the content 1008 based at least on the image(s) 1014 depicting the user 1012 or determine that the user 1012 is not interacting with the content 1008 based at least on the image(s) 1014 not depicting the user 1012.

The method 1100, at block B1110, may include causing, based at least on whether the user is interacting with the content, one or more operations associated with the session to occur. For instance, the session component 902 (e.g., the timer component 910) may cause the session to continue based at least on the user 1012 interacting with the content 1008 or cause the timer 912 to start based at least on the user 1012 not interacting with the content 1008. The session component 902 (e.g., the termination component 914) may then cause a notification 918 to be sent to the user device 1004 when the timer 912 reaches a first threshold period of time or cause the session to terminate when the timer 912 reaches a second threshold period of time.

Example Content Streaming System

Figure 12:
FIG. 12 is a block diagram of an example content streaming system suitable for use in implementing some embodiments of the present disclosure.
Figure 12:
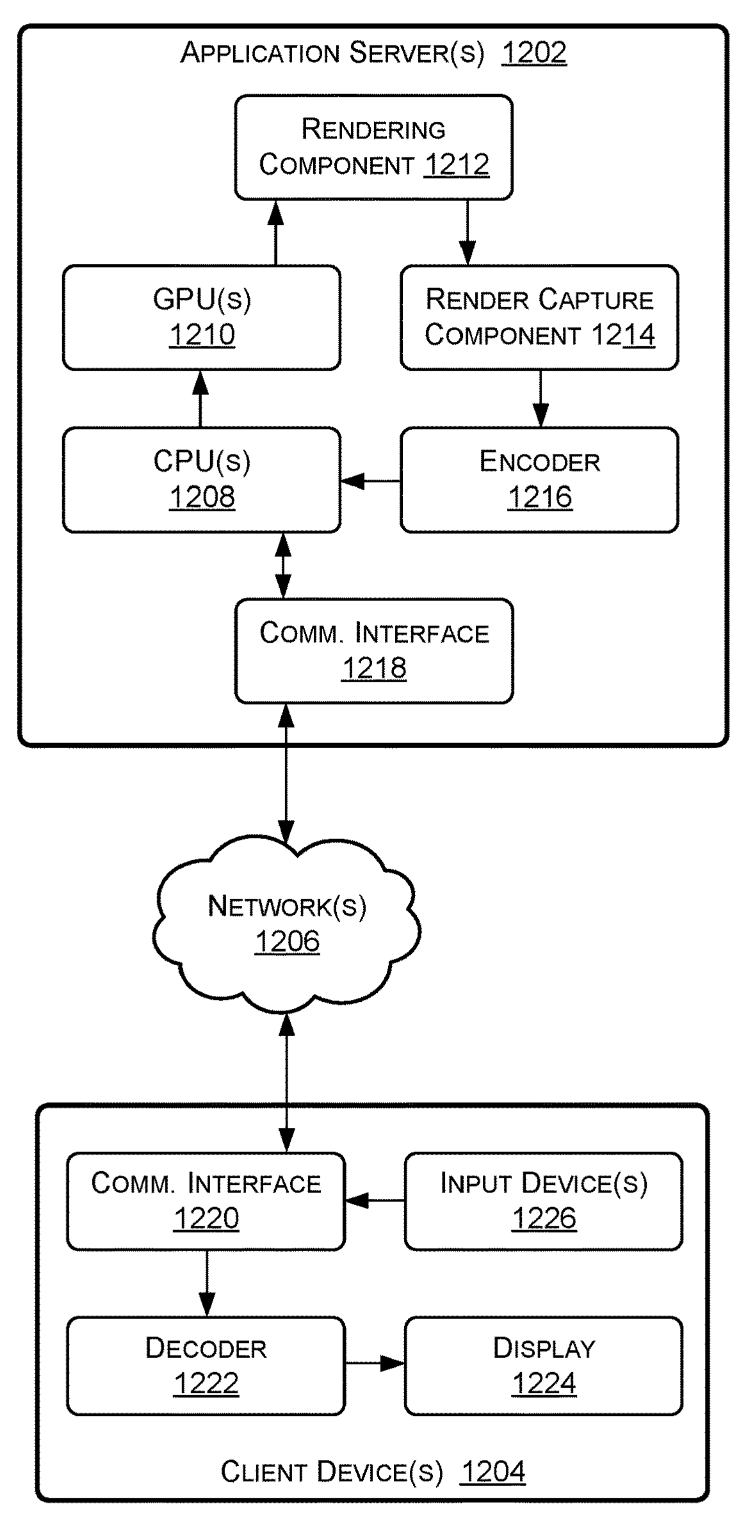

Now referring to FIG. 12, FIG. 12 is an example system diagram for a content streaming system 1200, in accordance with some embodiments of the present disclosure. FIG. 12 includes application server(s) 1202 (which may include similar components, features, and/or functionality to the example computing device 1300 of FIG. 13), client device(s) 1204 (which may include similar components, features, and/or functionality to the example computing device 1300 of FIG. 13), and network(s) 1206 (which may be similar to the network(s) described herein). In some embodiments of the present disclosure, the system 1200 may be implemented. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 1200, for an application session, the client device(s) 1204 may only receive input data in response to inputs to the input device(s), transmit the input data to the application server(s) 1202, receive encoded display data from the application server(s) 1202, and display the display data on the display 1224. As such, the more computationally intense computing and processing is offloaded to the application server(s) 1202 (e.g., rendering—in particular ray or path tracing—for graphical output of the application session is executed by the GPU(s) of the game server(s) 1202). In other words, the application session is streamed to the client device(s) 1204 from the application server(s) 1202, thereby reducing the requirements of the client device(s) 1204 for graphics processing and rendering.

For example, with respect to an instantiation of an application session, a client device 1204 may be displaying a frame of the application session on the display 1224 based on receiving the display data from the application server(s) 1202. The client device 1204 may receive an input to one of the input device(s) and generate input data in response. The client device 1204 may transmit the input data to the application server(s) 1202 via the communication interface 1220 and over the network(s) 1206 (e.g., the Internet), and the application server(s) 1202 may receive the input data via the communication interface 1218. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 1212 may render the application session (e.g., representative of the result of the input data) and the render capture component 1214 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 1202. In some embodiments, one or more virtual machines (VMs)—e.g., including one or more virtual components, such as vGPUs, vCPUs, etc.—may be used by the application server(s) 1202 to support the application sessions. The encoder 1216 may then encode the display data to generate encoded display data and the encoded display data may be transmitted to the client device 1204 over the network(s) 1206 via the communication interface 1218. The client device 1204 may receive the encoded display data via the communication interface 1220 and the decoder 1222 may decode the encoded display data to generate the display data. The client device 1204 may then display the display data via the display 1224.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Computing Device

Figure 13:
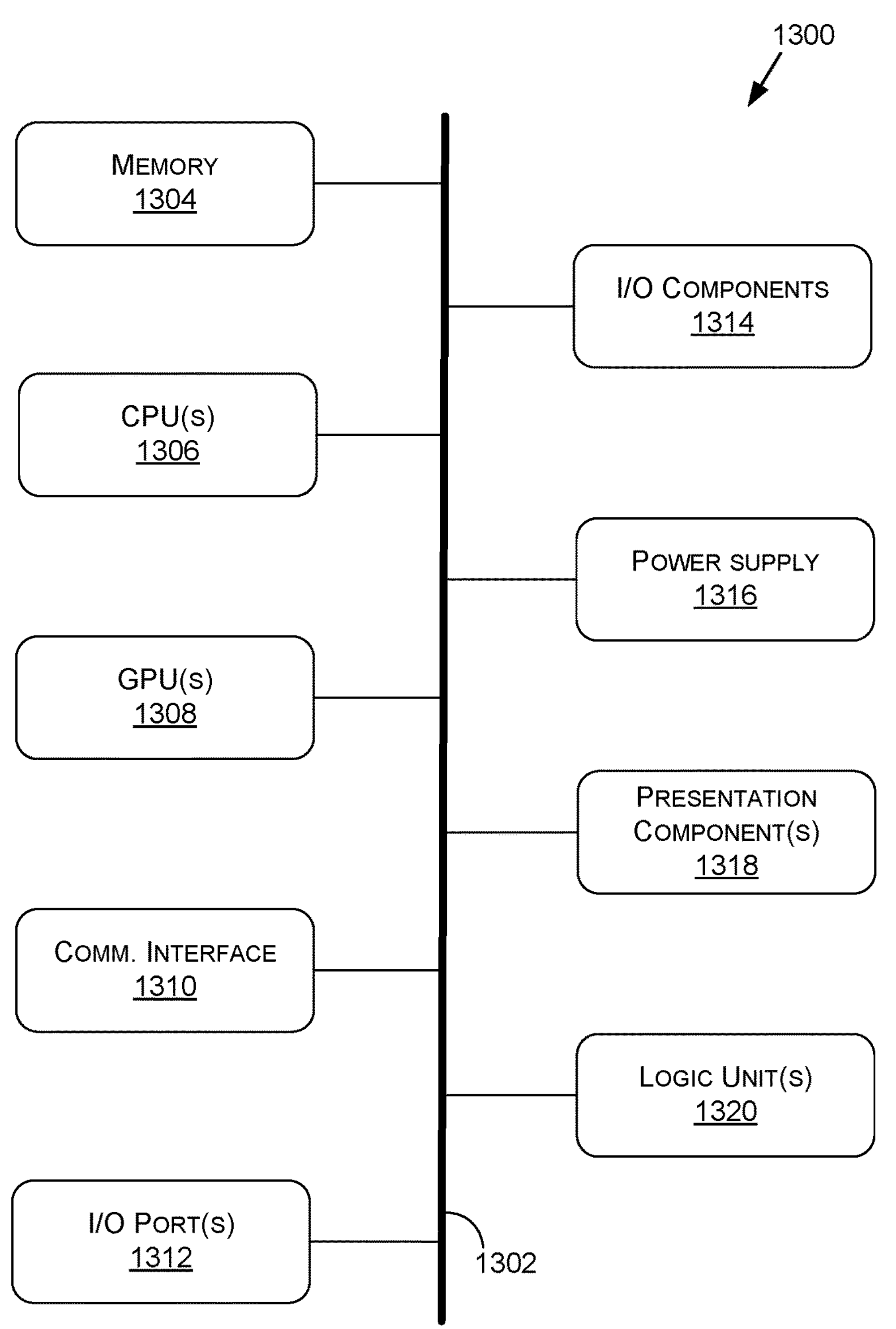
FIG. 13 is a block diagram of an example computing device suitable for use in implementing some embodiments of the present disclosure.

FIG. 13 is a block diagram of an example computing device(s) 1300 suitable for use in implementing some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more vGPUs, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
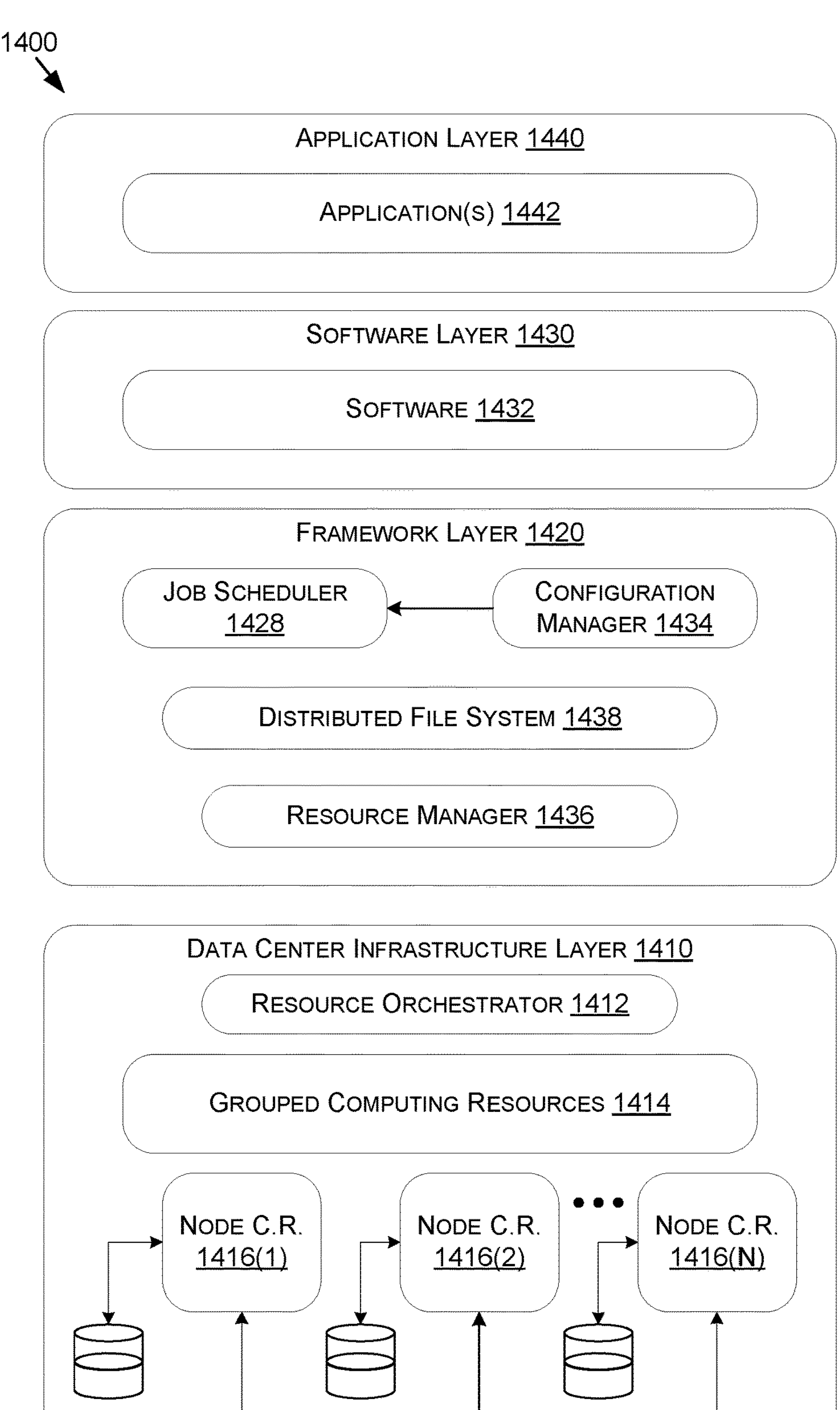
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161 (N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1428, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1428 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1428. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416 (1)-1416 (N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underutilized and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Clauses

A: A method comprising: obtaining image data generated using one or more image sensors of a first device, the image data representative of one or more images; obtaining audio data generated using one or more microphones of the first device, the audio data representative of user speech from a speaker; determining, based at least on the audio data, at least a position of the speaker with respect to the first device; and causing a second device to present the one or more images along with content indicating the position of the speaker with respect to the first device.

B: The method of paragraph A, wherein the determining the at least the position of the speaker with respect to the first device based at least on the audio data comprises determining, based at least on processing the audio data using beamforming, the position of the speaker with respect to the first device.

C: The method of paragraph A or paragraph B, further comprising: obtaining second image data from the second device, the second image data representative of one or more second images; obtaining content data representative of second content indicating a position of a second speaker with respect to the second device; and causing the first device to present the one or more second images along with the second content indicating the position of the second speaker with respect to the second device.

D: The method of any one of paragraphs A-C, further comprising: determining, based at least on at least one of the audio data or the image data, an identifier associated with the speaker; and causing the second device to further present the identifier along with the one or more images.

E: The method of paragraph D, wherein the identifier associated with the speaker comprises at least one of: a specific identifier represented by user data associated with the speaker; or a general identifier that is assigned to the speaker.

F: The method of any one of paragraphs A-E, further comprising generating the content, the content including text indicating at least one of a direction, a distance, or coordinates associated with the position of the speaker with respect to the first device.

G: The method of any one of paragraphs A-F, further comprising generating the content, the content including: a representation of an environment corresponding to the first device; and an indicator of the position of the speaker within the environment.

H: The method of any one of paragraphs A-G, further comprising: obtaining second image data generated using the one or more image sensors of the first device, the second image data representative of one or more second images; obtaining second audio data generated using the one or more microphones of the first device, the second audio data representative of second user speech from the speaker; determining, based at least on the second audio data, at least a second position of the speaker with respect to the first device; and causing the second device to present the one or more second images along with second content indicating the second position of the speaker with respect to the first device.

I: The method of any one of paragraphs A-H, further comprising: obtaining second image data generated using the one or more image sensors of the first device, the second image data representative of one or more second images; obtaining second audio data generated using the one or more microphones of the first device, the second audio data representative of second user speech from a second speaker; determining, based at least on the second audio data, at least a second position of the second speaker with respect to the first device; and causing the second device to present the one or more second images along with second content indicating the second position of the second speaker with respect to the first device.

J: The method of any one of paragraphs A-I, wherein the causing the second device to present the one or more images along with content comprises sending, to the second device, the image data along with content data representative of the content indicating the position of the speaker with respect to the first device.

K: A system comprising: one or more processing units to: obtain image data generated using one or more first sensors of a first device, the image data representative of one or more images; obtain sensor data generated using one or more second sensors of the first device; determine, based at least on the sensor data, at least a position of a speaker with respect to the first device; and cause a second device to present one or more images along with content indicating the position of the speaker with respect to the first device.

L The system of paragraph K, wherein: the sensor data includes at least audio data representing speech from the speaker; and the determining the at least the position of the speaker with respect to the first device comprises determining, based at least on analyzing the audio data using one or more acoustic source location processes, the position of the speaker with respect to the first device.

M: The system of paragraph K or paragraph L, wherein: the one or more sensors include at least one or more location sensors; and the determining the at least the position of the speaker with respect to the first device comprises determining, based at least on the sensor data, at least one of a distance or a direction of the speaker with respect to the first device.

N: The system of any one of paragraphs K-M, wherein the one or more processing units are further to: determine, based at least on at least one of the sensor data or the image data, an identifier associated with the speaker; and cause the second device to further present the identifier along with the one or more images.

O: The system of any one of paragraphs K-N, wherein the one or more processing units are further to: generate the content, the content including text indicating at least one of a direction, a distance, or coordinates associated with the position of the speaker with respect to the first device, wherein the causation of the one or more images to presented along with the content is based at least on sending the image data along with the content to the second device.

P: The system of any one of paragraphs K-O, wherein the one or more processing units are further to: generate the content, the content including: a representation of an environment corresponding to the first device; and an indicator of the position of the speaker within the environment, wherein the causation of the one or more images to presented along with the content is based at least on sending the image data along with the content to the second device.

Q: The system of any one of paragraphs K-P, wherein the one or more processing units are further to: obtain second image data from the second device, the second image data representative of one or more second images; obtain content data representative of second content indicating a second position of a second speaker with respect to the second device; and cause the first device to present the one or more second images along with the second content indicating the second position of the second speaker with respect to the second device.

R: The system of any one of paragraphs K-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S: One or more processors comprising: one or more processing units to cause a first device to present one or more images along with content representative of a position of a user that is speaking, wherein the position of the user is with respect to a second device used to generate image data representative of the one or more images and the position is determined based at least on audio data generated using one or more microphones of the second device.

T: The one or more processors of paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

U: A method comprising: establishing, between a remote system and a user device, a session associated with an application; sending, during the session and to the user device, content data associated with the application; receiving, during the session, image data from the user device; determining, based at least on the image data, whether a user is interacting with the content during the session; and causing, based at least on whether the user is interacting with the content, one or more operations associated with the session to occur.

V: The method of paragraph U, wherein the causing the one or more operations associated with the session to occur comprises one of: causing the session to remain in an active state based at least on the user interacting with the content; causing the session to terminate based at least on the user not interacting with the content; or causing a change to a state of the application or a state of the session to a less active state based at least on the user not registering an interaction with the content over a certain threshold of time.

W: The method of paragraph U or paragraph V, wherein: the determining whether the user is interacting with the content comprises determining, based at least on the image data, that the user is not interacting with the content; the method further comprises determining that the user is not interacting with the content for a threshold period of time; and the causing the one or more operations associated with the session to occur comprises causing at least one of: the session to terminate based at least on the user not interacting with the content for the threshold period of time, or to change a state of the application or the session to a less active state based at least on the user not registering an interaction with the content over a certain threshold of time.

X: The method of paragraph W, further comprising: determining that the user is not interacting with the content for a second threshold period of time that is less than the threshold period of time; and causing, based at least on the user not interacting with the content for the second threshold period of time, a notification to be sent to the user device.

Y: The method of any one of paragraphs U-X, wherein the determining whether the user is interacting with the content during the session comprises determining, based at least on the image data, that the user is interacting with the content based at least on one or more of: one or more images represented by the image data depicting at least a portion of the user; or a gaze direction associated with the user being substantially towards the user device.

Z: The method of any one of paragraphs U-Y, further comprising: receiving, during the session, at least one of audio data or location data from the user device, wherein the determining whether the user is interacting with the content during the session is further based at least on the at least one of the audio data or the location data.

AA: The method of paragraph Z, further comprising: determining that at least one of the audio data represents speech from the user or the location data represents a presence of the user, wherein the determining whether the user is interacting with the content during the session is further based at least on the at least one of the audio data representing the speech from the user or the location data representing the presence of the user.

AB: The method of any one of paragraphs U-AA, further comprising: determining, based at least on the image data, an identity associated with the user that is interacting with the content during the session, wherein the causing the one or more operations associated with the session to occur is further based at least on the identity associated with the user.

AC: The method of any one of paragraphs U-AB, wherein: the determining whether the user is interacting with the content during the session comprises determining, based at least on the image data, that the user is not interacting with the content during the session; the causing the one or more operations associated with the session to occur comprises causing, based at least on the user not interacting with the content, a timer associated with terminating the session to start; and the method further comprises: receiving, during the session, second image data from the user device; determining, based at least on the second image data, the user is interacting with the content during the session; and causing, based at least on the user interacting with the content, the timer to stop.

AD: A system comprising: one or more processing units to: establish an application session with a user device; send, during the application session and to the user device, content data representative of content associated with the application session; receive, during the application session, image data from the user device; determine, based at least on the image data, whether a user is interacting with the content; and cause, based at least on whether the user is interacting with the content, one or more operations associated with the application session to occur.

AE: The system of paragraph AD, wherein the causation of the one or more operations associated with the application session to occur comprises one of: causing the application session to stay active based at least on the user interacting with the content; causing the application session to terminate based at least on the user not interacting with the content; or causing the a change to a state of the application session to a less active state based at least on the user not registering an interaction with the content over a certain threshold of time.

AF: The system of paragraph AD or paragraph AE, wherein: the determination of whether the user is interacting with the content comprises determining, based at least on the image data, that the user is not interacting with the content; the one or more processing units are further to determine that the user is not interacting with the content for a threshold period of time; and the causation of the one or more operations associated with the application session to occur comprises causing the application session to terminate based at least on the user not interacting with the content for the threshold period of time.

AG: The system of paragraph AF, wherein the one or more processing units are further to: determine that the user is not interacting with the content for a second threshold period of time that is less than the threshold period of time; and cause, based at least on the user not interacting with the content for the second threshold period of time, a notification to be sent to the user device.

AH: The system of any one of paragraphs AD-AG, wherein the determination of whether the user is interacting with the content comprises determining, based at least on the image data, that the user is interacting with the content based at least on one or more of: one or more images represented by the image data depicting at least a portion of the user; or a gaze direction associated with the user being substantially towards the user device.

AI: The system of any one of paragraphs AD-AH, wherein the one or more processing units are further to: receive, during the application session, at least one of audio data or location data from the user device, wherein the determination of whether the user is interacting with the content is further based at least on the at least one of the audio data or the location data.

AJ: The system of any one of paragraphs AD-AI, wherein the one or more processing units are further to: determine, based at least on the image data, an identity associated with the user that is interacting with the content, wherein the causation of the one or more operations associated with the application session to occur is further based at least on the identity associated with the user.

AK: The system of any one of paragraphs AD-AJ, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

AL: A processor comprising: one or more processing units to: establish, between a remote system and a user device, a session associated with an application; send, during the session and to the user device, content data representative of content associated with the session; receive, during the session, image data from the user device; determine, based at least on the image data, whether a user is interacting with the content during the session; and cause, based at least on whether the user is interacting with the content, one or more operations associated with the session to occur.

AM: The processor of paragraph AL, wherein the causation of the one or more operations associated with the session to occur comprises one of: causing the session to stay active based at least on the user interacting with the content; causing the session to terminate based at least on the user not interacting with the content; or causing a change to a state of the application or a state of the session to a less active state based at least on the user not registering an interaction with the content over a certain threshold of time.

AN: The one or more processors of paragraph AL or paragraph AM, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:

establishing, between a remote system and a user device, a session associated with a gaming application;

sending, during the session and to the user device, content data representative of content associated with the gaming application;

receiving, during the session and from the user device, input data associated with a physical contact interaction with one or more input devices of the user device to cause an action associated with the gaming application, and sensor data associated with a non-physical contact interaction;

determining, using at least the input data, an absence of the physical contact interaction during a period of time of the session;

in response to the absence of the physical contact interaction during the period of time, determining, using at least the sensor data, whether a user was still interacting with the content using the non-physical contact interaction and during the period of time; and causing, based at least on whether the user was still interacting with the content using the non-physical contact interaction and during the period of time, one or more operations associated with the session to occur.

2. The method of claim 1, wherein the causing the one or more operations associated with the session to occur comprises one of:

causing the session to remain in an active state based at least on the user interacting with the content using the non-physical contact interaction;

causing the session to terminate based at least on the user not interacting with the content using the non-physical contact interaction; or causing a change to a state of the gaming application or a state of the session to a less active state based at least on the user not registering an interaction with the content over a certain threshold of time.

3. The method of claim 1, wherein:

the determining whether the user was still interacting with the content using the non-physical contact interaction and during the period of time comprises determining, based at least on the sensor data, that the user is not interacting with the content using the non-physical contact interaction and during the period of time;

the method further comprises determining that the user is not interacting with the content for a threshold period of time; and the causing the one or more operations associated with the session to occur comprises causing the session to terminate based at least on the user not interacting with the content for the threshold period of time.

4. The method of claim 3, further comprising:

determining that the user is not interacting with the content for a second threshold period of time that is less than the threshold period of time; and causing, based at least on the user not interacting with the content for the second threshold period of time, a notification to be sent to the user device.

5. The method of claim 1, wherein the determining whether the user was still interacting with the content using the non-physical contact interaction and during the period of time comprises determining, based at least on the sensor data, that the user was interacting with the content using the non-physical contact interaction and during the period during time based at least on one or more of:

one or more images represented by the sensor data depicting at least a portion of the user; or a gaze direction associated with the user being substantially towards the user device.

6. The method of claim 1, wherein:

the sensor data includes at least audio data from the user device; and the determining whether the user was still interacting with the content using the non-physical contact interaction and during the period during time comprises determining whether the audio data is representative of speech from the user for the period of time during the session.

7. The method of claim 1, wherein:

the sensor data includes at least location data from the user device; and the determining whether the user was still interacting with the content using the non-physical contact interaction and during the period of time comprises determining whether the location data represents a presence of the user proximate to the user device during the period of time.

8. The method of claim 1, further comprising:

determining, based at least on the sensor data, an identity associated with the user that is interacting with the content during the session, wherein the causing the one or more operations associated with the session to occur is further based at least on the identity associated with the user.

9. The method of claim 1, wherein:

the determining whether the user was still interacting with the content using the non-physical contact interaction and during the period of time comprises determining, based at least on the sensor data, that the user was not interacting with the content using the non-physical contact interaction and during the period of time;

the causing the one or more operations associated with the session to occur comprises causing, based at least on the user not interacting with the content, a timer associated with terminating the session to start; and the method further comprises:

receiving, during the session, second sensor data from the user device;

determining, based at least on the second sensor data, the user is interacting with the content during the session; and causing, based at least on the user interacting with the content, the timer to stop.

10. A system comprising:

one or more processors to:

establish an application session with a user device;

send, during the application session and to the user device, content data representative of content associated with the application session;

determine an absence of one or more physical inputs provided to one or more input devices of the user device during a period of time of the application session;

receive, during the period of time of the application session, audio data from the user device;

determine, in response to the absence of the one or more physical inputs and during the period of time of the application session, whether the audio data is representative of speech from a user of the application session;

determine, based at least on whether the audio data is representative of the speech during the period of time of the application session, whether the user is still interacting with the content during the period of time of the application session even with the absence of the one or more physical inputs; and cause, based at least on whether the user is interacting with the content, one or more operations associated with the application session to occur.

11. The system of claim 10, wherein to cause the one or more operations associated with the application session to occur comprises one of:

causing the application session to stay active based at least on the user still interacting with the content;

causing the application session to terminate based at least on the user not interacting with the content; or causing a change to a state of the application session to a less active state based at least on the user not registering an interaction with the content over a certain threshold of time.

12. The system of claim 10, wherein:

the determination of whether the user is interacting with the content during the period of time of the application session comprises determining, based at least on whether the audio data is representative of the speech, that the user is not interacting with the content during the period of time of the application session;

the one or more processors are further to determine that the user is not interacting with the content for a threshold period of time; and to cause the one or more operations associated with the application session to occur comprises causing the application session to terminate based at least on the user not interacting with the content for the threshold period of time.

13. The system of claim 12, wherein the one or more processors are further to:

determine that the user is not interacting with the content for a second threshold period of time that is less than the threshold period of time; and cause, based at least on the user not interacting with the content for the second threshold period of time, a notification to be sent to the user device.

14. The system of claim 10, wherein the determination of whether the user is still interacting with the content during the period of time of the application session comprises one of:

determining that the user is not interacting with the content during the period of time of the application session based at least on the audio data not being representative of the speech; or determining that the user is interacting with the content during the period of time of the application session based at least on the audio data being representative of the speech.

15. The system of claim 10, wherein the one or more processors are further to:

receive, during the period of time of the application session, at least one of image data or location data from the user device, wherein the determination of whether the user is still interacting with the content during the period of time of the application session is further based at least on the at least one of the image data or the location data.

16. The system of claim 10, wherein the one or more processors are further to:

determine, based at least on the audio data, whether context of the speech from the user is associated with the application session, wherein the determination of whether the user is interacting with the content during the period of time of the application session is based at least on whether the context is associated with the application session.

17. The system of claim 10, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using a large language model;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

18. A processor comprising processing circuitry to:

establish, between a remote system and a user device, a session associated with a gaming application;

send, during the session and to the user device, content data representative of content associated with the session;

receive, during the session and from the user device, input data associated with a physical contact interaction with one or more input devices of the user device to cause an action associated with the gaming application, and sensor data associated with a non-physical contact interaction;

determine, using the input data, an absence of the physical contact interaction during a period of time of the session;

determine, in response to the absence of the physical contact interaction during the period of time and using the sensor data, whether a user was still interacting with the content using the non-physical contact interaction during the period of time of the session; and cause, based at least on whether the user was still interacting with the content using the non-physical contact interaction and during the period of time, one or more operations associated with the session to occur.

19. The processor of claim 18, wherein to cause the one or more operations associated with the session to occur comprises one of:

causing the session to stay active based at least on the user interacting with the content; or causing the session to terminate based at least on the user not interacting with the content.

20. The processor of claim 18, wherein the processor is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using a large language model;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *